United States Patent
Caplow-Munro et al.

(10) Patent No.: US 12,306,671 B2
(45) Date of Patent: *May 20, 2025

(54) TIMING MECHANISM FOR FOLDABLE COMPUTING DEVICE

(71) Applicant: Microsoft Technology Licensing, LLC, Redmond, WA (US)

(72) Inventors: Devin Samuel Jacob Caplow-Munro, Seattle, WA (US); Daniel Clark Park, Woodinville, WA (US); Eric Paul Witt, Redmond, WA (US); Karsten Aagaard, Monroe, WA (US); Denys V Yaremenko, Bellevue, WA (US); Brett Andrew Tomky, Seattle, WA (US); Errol Mark Tazbaz, Bellevue, WA (US); Tung Yuen Lau, Hong Kong (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/062,925

(22) Filed: Dec. 7, 2022

(65) Prior Publication Data
US 2023/0393633 A1 Dec. 7, 2023

Related U.S. Application Data

(60) Provisional application No. 63/365,832, filed on Jun. 3, 2022.

(51) Int. Cl.
*G06F 1/16* (2006.01)
(52) U.S. Cl.
CPC .......... *G06F 1/1652* (2013.01); *G06F 1/1641* (2013.01); *G06F 1/1681* (2013.01)

(58) Field of Classification Search
CPC .... G06F 1/1652; G06F 1/1641; G06F 1/1681; H04M 1/022; H04M 1/0268
See application file for complete search history.

(56) References Cited

U.S. PATENT DOCUMENTS

| 8,966,715 B1 | 3/2015 | Chen et al. |
| 10,831,242 B1 | 11/2020 | He et al. |

(Continued)

FOREIGN PATENT DOCUMENTS

| CN | 114466092 A | 5/2022 |
| GB | 2523421 A | 8/2015 |

(Continued)

OTHER PUBLICATIONS

"Application as Filed in U.S. Appl. No. 17/706,078", Filed Date: Mar. 28, 2022, 33 Pages.

(Continued)

*Primary Examiner* — Rockshana D Chowdhury
(74) *Attorney, Agent, or Firm* — Alleman Hall & Tuttle LLP

(57) ABSTRACT

A foldable computing device comprises a first portion, a second portion, a hinge assembly rotatably coupling the first portion to the second portion, and a flexible display. The hinge assembly includes a hinge core, a timing element, a first linkage component rotatably coupling the hinge core to the first portion, a first hinge guide rotatably coupling the hinge core to the first portion, a second linkage component rotatably coupling the hinge core to the second portion, and a second hinge guide rotatably coupling the hinge core to the second portion. The first linkage component defines one or more helical surfaces that interface with the timing element, and the second linkage component defines one or more helical surfaces that interface with the timing element. The (Continued)

timing element coordinates rotation of the first linkage component with rotation of the second linkage component.

14 Claims, 24 Drawing Sheets

(56) References Cited

U.S. PATENT DOCUMENTS

| | | | |
|---|---|---|---|
| 10,901,464 B2 | 1/2021 | Seo | |
| 11,294,431 B2* | 4/2022 | Torres | E05D 3/06 |
| 11,467,633 B2* | 10/2022 | Liao | F16C 11/04 |
| 11,656,659 B2* | 5/2023 | Choi | G06F 1/1681 |
| | | | 361/679.27 |
| 11,681,335 B1* | 6/2023 | Hsu | G06F 1/1681 |
| | | | 361/679.01 |
| 11,920,395 B2* | 3/2024 | Quynh | H04M 1/022 |
| 11,937,391 B2* | 3/2024 | Gong | H04M 1/0268 |
| 11,977,421 B2* | 5/2024 | Yang | G06F 1/1681 |
| 11,989,055 B2* | 5/2024 | Soh | H04M 1/0268 |
| 12,006,969 B2* | 6/2024 | Zhang | G06F 1/1681 |
| 12,081,687 B2* | 9/2024 | Mody | H04M 1/022 |
| 2014/0223693 A1 | 8/2014 | Hsu | |
| 2016/0326786 A1 | 11/2016 | Lee et al. | |
| 2020/0233466 A1 | 7/2020 | Sanchez et al. | |
| 2020/0329574 A1* | 10/2020 | Lee | H04M 1/0268 |
| 2020/0371561 A1* | 11/2020 | Lin | E05D 3/18 |
| 2020/0409427 A1* | 12/2020 | Hsu | G06F 1/1681 |
| 2021/0011513 A1* | 1/2021 | Watamura | G06F 1/1652 |
| 2021/0034117 A1 | 2/2021 | Torres et al. | |
| 2021/0048852 A1 | 2/2021 | Hsu | |
| 2021/0373609 A1* | 12/2021 | Kim | G06F 1/1681 |
| 2022/0104370 A1 | 3/2022 | Wu | |
| 2022/0155828 A1 | 5/2022 | Hsiang | |
| 2024/0219973 A1* | 7/2024 | Zhang | G06F 1/1616 |

FOREIGN PATENT DOCUMENTS

| | | |
|---|---|---|
| TW | 201915639 A | 4/2019 |
| WO | 2021129407 A1 | 7/2021 |

OTHER PUBLICATIONS

U.S. Appl. No. 18/062,902, filed Dec. 7, 2022.

"International Search Report and Written Opinion Issued in PCT Application No. PCT/US23/018780", Mailed Date: Sep. 18, 2023, 24 Pages.

"Invitation to Pay Additional Fees Issued in PCT Application No. PCT/US23/018780", Mailed Date: Jul. 24, 2023, 19 Pages.

"International Search Report and Written Opinion Issued in PCT Application No. PCT/US23/018781", Mailed Date: Sep. 18, 2023, 20 Pages.

"Invitation to Pay Additional Fees Issued in PCT Application No. PCT/US23/018781", Mailed Date: Jul. 26, 2023, 14 Pages.

Non-Final Office Action mailed on Feb. 6, 2025, in U.S. Appl. No. 18/062,902, 12 pages.

* cited by examiner

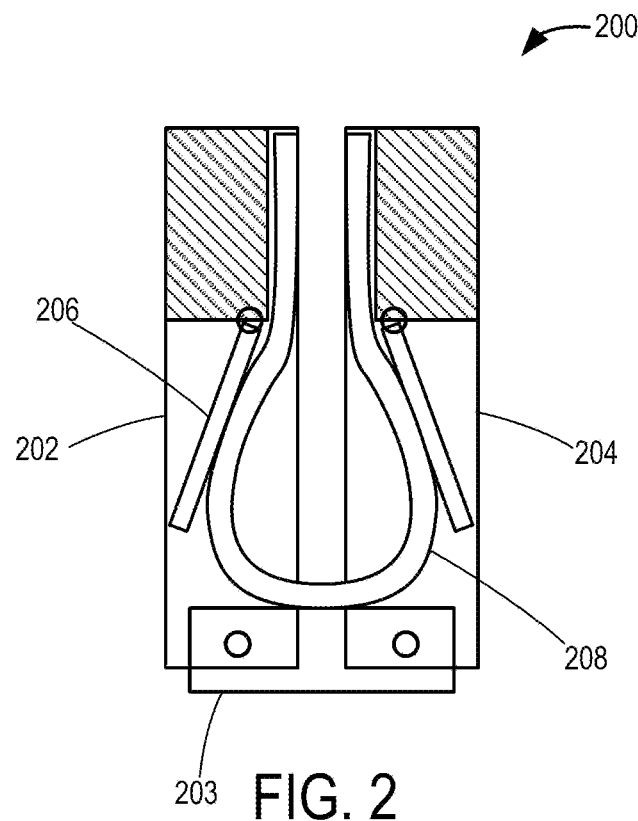
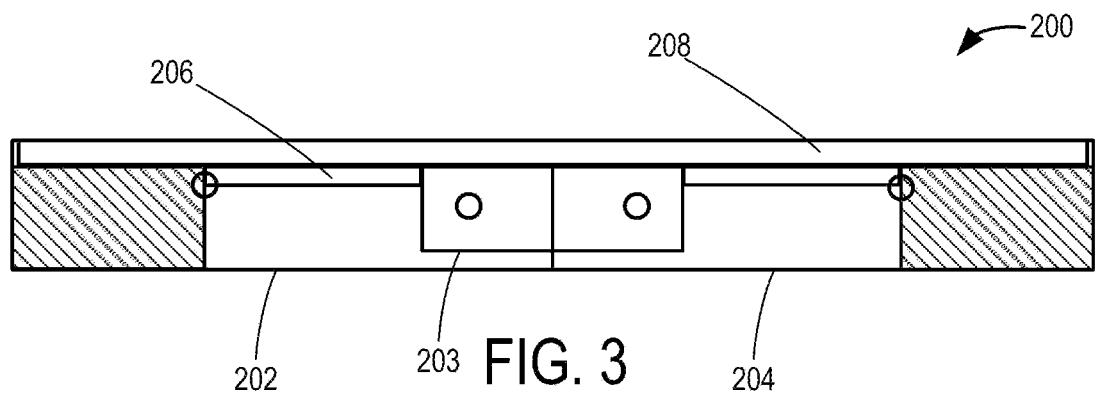

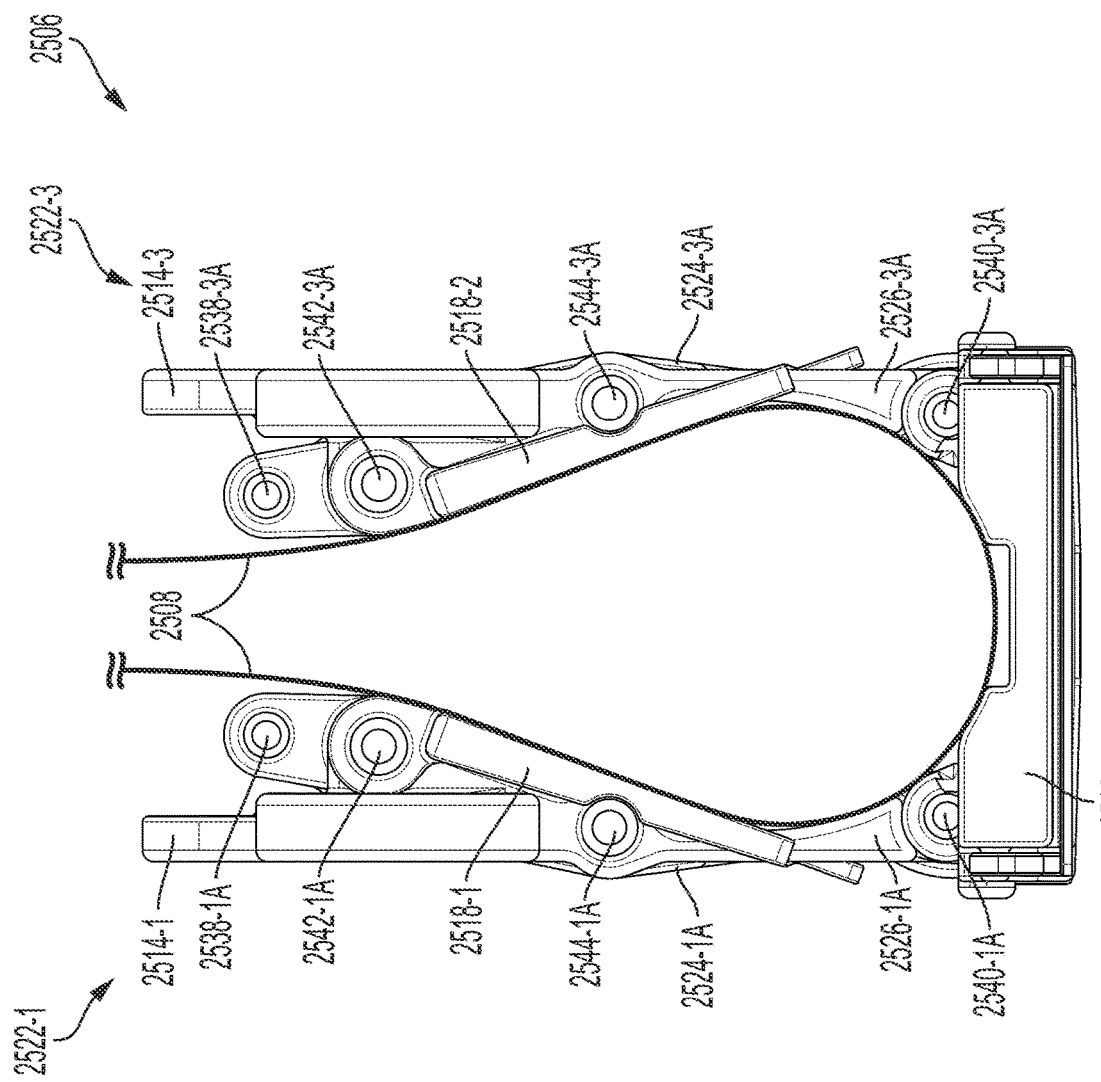

TIMING MECHANISM FOR FOLDABLE COMPUTING DEVICE

CROSS REFERENCE TO RELATED APPLICATIONS

This application claims priority to U.S. Provisional Patent Application Ser. No. 63/365,832, filed Jun. 3, 2022, entitled, "COMPUTING DEVICE WITH HINGE AND FLEXIBLE DISPLAY", the entirety of which is hereby incorporated herein by reference for all purposes.

BACKGROUND

Some computing devices include a hinge that allows the computing device to be reconfigured between folded and unfolded configurations. The folded configuration may provide for compact storage and carrying, while the unfolded configuration may reveal a display that spans the hinge.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an example, a foldable computing device comprises a first portion, a second portion, a hinge assembly rotatably coupling the first portion to the second portion, and a flexible display. The flexible display extends at least partially across the first portion, at least partially across the second portion, and spans the hinge assembly between the first portion and the second portion.

The hinge assembly includes a hinge core, a timing element, a first linkage component rotatably coupling the hinge core to the first portion, a first hinge guide rotatably coupling the hinge core to the first portion, a second linkage component rotatably coupling the hinge core to the second portion, and a second hinge guide rotatably coupling the hinge core to the second portion. The first linkage component defines one or more helical surfaces that interface with the timing element, and the second linkage component defines one or more helical surfaces that interface with the timing element. The timing element coordinates rotation of the first linkage component with rotation of the second linkage component.

BRIEF DESCRIPTION OF THE DRAWINGS

FIG. 2 schematically shows an example foldable computing device in a closed/folded configuration.

FIG. 3 schematically shows the example foldable computing device of FIG. 2 in an open/unfolded configuration.

FIG. 33 shows the end view of the hinge assembly of FIG. 31 with the flexible display in the closed/folded configuration.

DETAILED DESCRIPTION

Figure 1:
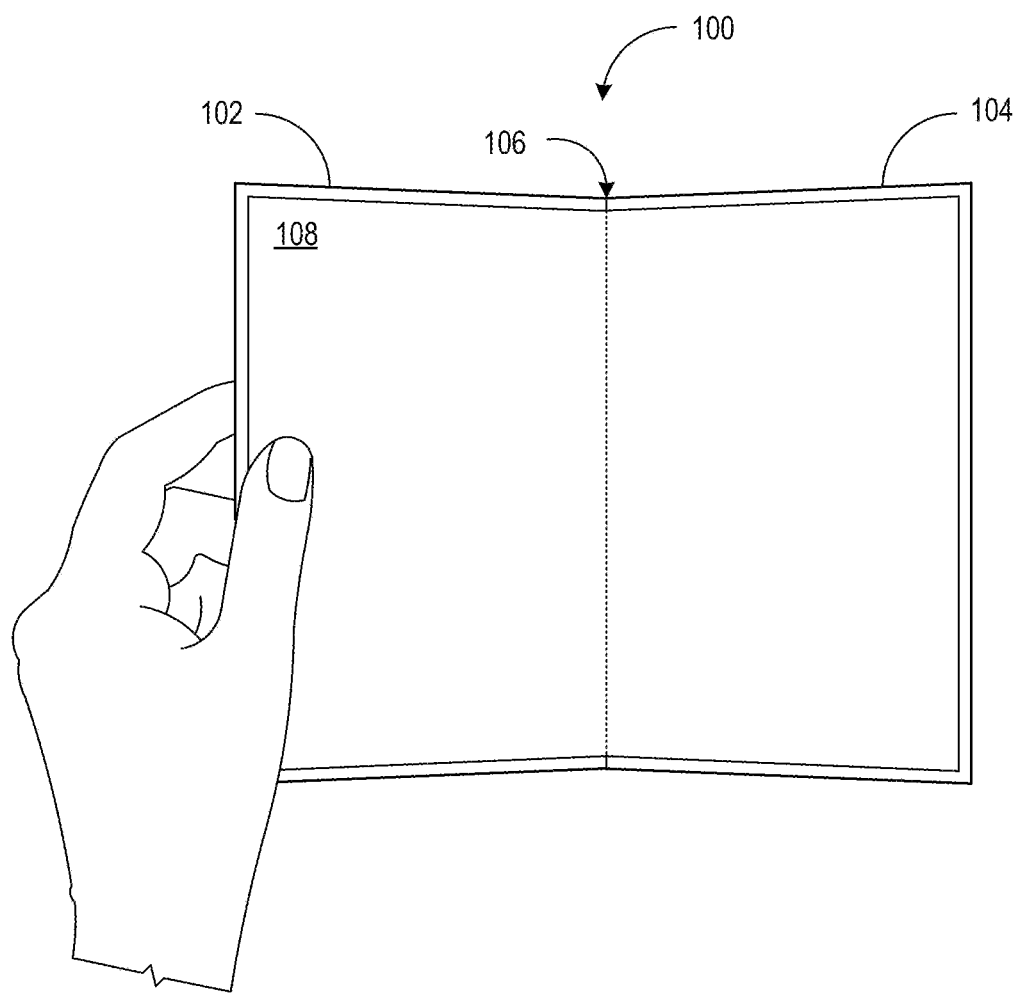
FIG. 1 shows an example foldable computing device.

Some computing devices include two portions connected by a hinge that allows the computing device to be reconfigured between a closed/folded configuration and an open/unfolded configuration. The closed/folded configuration may provide for compact storage and carrying of the computing device, while the open/unfolded configuration may reveal a display that spans the two portions of the computing device. Some foldable computing devices include separate displays on first and second device portions. However, in such devices, a seam between the two displays may disrupt a continuity of a displayed image that spans the two device portions.

Thus, other foldable computing devices may utilize a single flexible display, such as a flexible organic light emitting diode (OLED) display, that spans the two device portions. Use of a single display that spans a hinge of a foldable computing device may help to avoid the appearance of a seam that interrupts the continuity of an image or other graphical content displayed across the device portions. However, incorporating a foldable display into a computing device may pose challenges.

As one example, repeated folding of a display (e.g., an OLED display) over time may damage the display if the display bends too sharply at the hinge when folded. On the other hand, providing sufficient space to accommodate a less sharp bend in the display may result in a thicker device profile that is less convenient to transport or store, particularly for mobile computing devices. Also, if a computing device hinge fails to provide suitably flat and/or supportive backing for a flexible display at any portion of the hinge or over any portion of the display, a user may notice visual wrinkles in the display surface and inconsistency in mechanical support for the display, for example, when making touch inputs.

In view of such challenging design considerations, current foldable computing devices may utilize different structural components for linking the device's chassis portions on each side of the hinge and for mechanically supporting the display. The use of separate components for these functions may result in a relatively complex hinge design, with a relatively larger number of components.

Accordingly, examples are disclosed that relate to foldable computing devices (e.g., mobile computing devices) comprising hinge assemblies that may address one or more of the above issues. As described in more detail below, the disclosed examples include hinge assemblies with mechanical linkages that also provide a backing support surface for a flexible display.

Examples of foldable computing devices are disclosed that include one or more multi-bar linkages (e.g., four-bar linkages) for each side of a hinge assembly that enable a flexible display to have a flat/planar configuration in an open/unfolded configuration of the computing device, and a curved shape in a closed/folded configuration of the computing device. As an example, each multi-bar linkage can enable a portion of the flexible display to have a curved shape with a suitable radius or angular rate of curvature (e.g., a minimum design radius or maximum angular rate of curvature) when folded that avoids or reduces wear on the flexible display as compared to flexible displays that are instead folded across a sharp bend.

Furthermore, multi-bar linkages that include four (e.g., a four-bar linkage) or a greater quantity of linkages offer the potential to structurally support a flexible display across a range of motion between an open/unfolded configuration and a closed/folded configuration, while also supporting a suitable curvature and overall shape of the flexible display in the closed/folded configuration.

As an example, a four-bar linkage or multi-bar linkage having a greater quantity of linkages on each side of a computing device hinge can provide a structural backing support for the flexible display that changes shape between the open/unfolded and the closed/folded configuration. In the open/unfolded configuration, for example, the backing support can form a flat, planar configuration so that the flexible display is supported along a plane. In the closed/folded configuration, the backing support on each side of the hinge can form an angled configuration in which two or more of the linkages are angled relative to each other. For example, two or more linkages that are angled relative to each other can form the backing support in the closed/folded configuration to define a curved, "teardrop" shape of the flexible display.

In at least some examples, the curved, "teardrop" shape enabled by the four or more linkages can define a curved region of the flexible display along the spine and hinge assembly of the computing device that has a wider dimension between opposing sides of the flexible display as compared to regions of the opposing sides of the flexible display that are more distantly located from the spine and hinge assembly. This curved region of the flexible display can reduce degradation, damage, or wear to the flexible display. Furthermore, in at least some examples, narrowing of a distance between opposing sides of the flexible display at regions located remotely from the spine and hinge assembly can enable other components of the computing device, such as processing and memory components, batteries, power supplies, etc. to occupy regions of the device body on the rear sides of the flexible display. Collectively, these features enable a computing device to provide both a compact form factor in a closed/folded configuration that also provides a suitable radius or angular rate of curvature of the flexible display in the vicinity of the spine and hinge assembly.

In at least some examples, one or more joints of the multi-bar linkages described above can provide a virtual pivot for the hinge assembly of a foldable computing device. As an example, a virtual pivot of a four-bar linkage can be located at a position that is displaced from hardware components (e.g., the hinge core or beyond the body of the computing device) to provide a greater range of backing support configurations for the flexible display across a range of motion between folding and unfolding the computing device. For example, a virtual pivot can provide a greater radius or angular rate of curvature of the flexible display for a given size (e.g., thickness) of the computing device as compared to other linkage configurations that feature a lesser quantity of linkages and joints.

Integrating mechanical support for a flexible display into linkages of a hinge assembly may help to reduce a number of components of the hinge assembly as compared to the use of separate structures for these functions. Further, the disclosed examples may provide for a relatively higher degree of display flatness, a relatively lower device thickness, and/or a relatively lower degree of spine protrusion than other hinge designs. Also, in at least some examples, a friction engine and/or a timing mechanism may be integrated into a hinge assembly of the computing device, which may further help to reduce a quantity of hinge components and/or a size (e.g., thickness) of the computing device.

FIG. 1 shows an example foldable computing device 100. Computing device 100 includes a first portion 102 and a second portion 104 connected at a hinge 106. A flexible display 108 spans first portion 102, second portion 104, and hinge 106. Hinge 106 enables first portion 102 to be rotated relative to second portion 104 to provide a variety of different postures for the computing device. The flexibility of display 108 allows display 108 to bend to adapt to a relative angle of first portion 102 to second portion 104.

Computing device 100 may take any suitable form. Examples of computing device 100 include hand-held and/or mobile devices, such as a foldable smart phone and a foldable tablet computer. Display 108 may comprise any suitable type of flexible display. In some examples, display 108 comprises a flexible OLED display. In some examples, display 108 may include an integrated touch sensor to sense touch inputs, such as one or more digits of a user and/or a stylus.

FIGS. 2 and 3 schematically illustrate functional aspects of a hinge according to the present disclosure, while omitting details of the connection of linkage components to a hinge core. Examples of linkage components are described in further detail below.

More specifically, FIG. 2 schematically shows an example foldable computing device 200 in a closed/folded configuration, and FIG. 3 shows computing device 200 in an open/unfolded configuration. Computing device 200 comprises a first portion 202 connected by a hinge core 203 to a second portion 204. First portion 202 is coupled with a linkage component, illustrated schematically at 206. Second component 204 is coupled with a similar linkage component. Linkage component 206 allows a flexible display 208 to assume a "teardrop" shape when computing device 200 is in a closed/folded configuration. As previously described, this "teardrop" shape of flexible display 208 may reduce degradation, damage, or wear to flexible display 208 over a potentially large number of folding or unfolding cycles.

Further, linkage component 206 provides a suitably rigid backing support for flexible display 208 when computing device is 200 is in an open/unfolded configuration. In the open/unfolded configuration, flexible display 208 is planar or substantially planar, and a backing support surface of linkage component 206 (a surface that contacts or is supported by flexible display 208) is generally coplanar with a backing support surface of hinge core 203, and with a backing support surface of first portion 202. This coplanar configuration of backing support components enables the flexible display to be supported while forming a flat display surface in the open/unfolded configuration. In this manner, linkage component 206 integrates both the linkage and backing support functions into the same piece or component. In contrast, separate pieces or components may be used to implement these functions in other devices.

Figure 4:
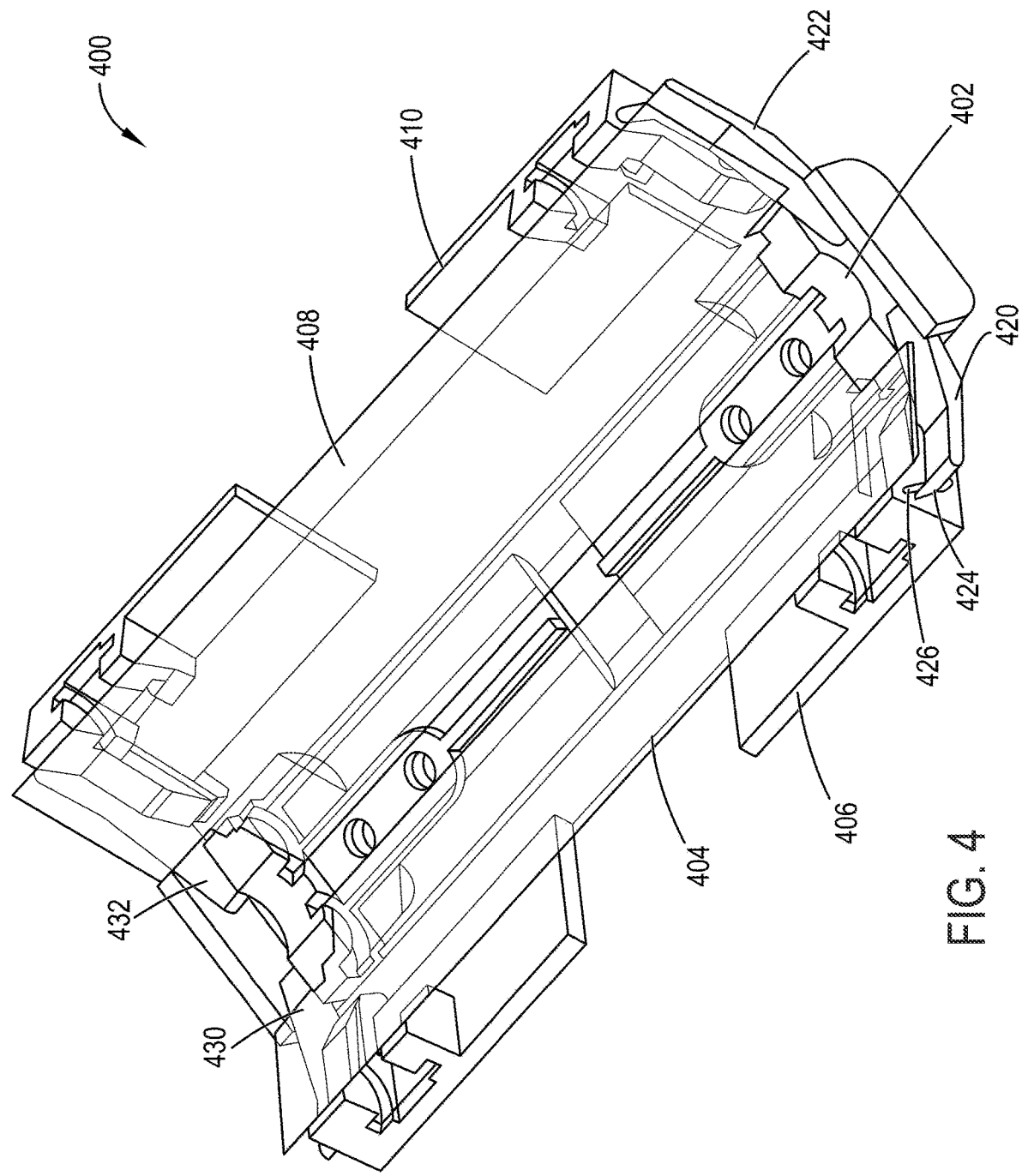
FIG. 4 shows an example hinge assembly for a foldable computing device.

FIG. 4 shows a more detailed example hinge assembly 400 for a foldable computing device (e.g., a mobile device). Within FIG. 4, hinge assembly 400 is depicted in wireframe to show components that may otherwise be obscured from view. Hinge assembly 400 comprises a hinge core 402 and a first linkage component 404 linking the hinge core to a first bracket 406. First bracket 406 may attach to a chassis of a first portion of a computing device, or may be integrated with a chassis of a first portion of a computing device. As such, first linkage component 404 couples a first portion of a computing device to hinge core 402. A second linkage component 408 similarly couples hinge core 402 to a second bracket 410 of a second portion of a computing device. First linkage component 404 and second linkage component 408 are each configured to provide a backing support for a flexible display when hinge assembly 400 is in an open/unfolded configuration. First linkage component 404 and second linkage component 408 are also configured to allow a flexible display to assume a curved, "teardrop" shape when hinge assembly 400 is in a closed/folded configuration. The use of first linkage component 404 and second linkage component 408 on opposing sides of hinge core 402 can enable a symmetric range of rotation of first bracket 406 and second bracket 410 relative to the hinge core.

Hinge assembly 400 further comprises a first hinge guide 420 and a second hinge guide 422. First hinge guide 420 comprises a protrusion 424 that fits within a slot 426 of first bracket 406. Second hinge guide 422 similarly includes a protrusion that fits within a slot of second bracket 410. Hinge assembly 400 also comprises a third hinge guide 430 and a fourth hinge guide 432, both of which include protrusions that fit within corresponding slots of first bracket 406 and second bracket 410 respectively. Protrusions of hinge guides may take various forms, including circular pins (e.g., as described with reference to FIGS. 5-10) and elongate protrusions having multiple contact surfaces (e.g., as described with reference to FIGS. 11, 17, and 21). The use of elongate protrusions having multiple contact surfaces may be used to preclude rotation of the protrusion within the slot, whereas the use of a pin may be used to enable rotation of the protrusion within the slot to provide increased freedom of movement of the hinge guide.

In this example, each hinge guide forms a portion of a four-bar linkage that also includes the corresponding linkage component, hinge core, and bracket (e.g., the first or second portion of the computing device mounted to the bracket). Each four-bar linkage can provide a backing support for a flexible display on one side of the hinge core that enables the flexible display to form a curved, "teardrop" shape in a closed/folded configuration of a computing device, and a flat or planar shape in an open/unfolded configuration of the computing device.

As an example, a first four-bar linkage comprises hinge guide 420, hinge core 402, linkage component 404, and bracket 406. In this example, hinge core 402 takes the form of a ground linkage of the first four-bar linkage, hinge guide 420 and linkage component 404 take the form of rocker linkages of the first four-bar linkage, and bracket 406 takes the form of a coupler linkage of the first four-bar linkage. The virtual pivot of bracket 406, in this example, is located at the intersection of an effective centerline of hinge guide 420 and an effective centerline of linkage component 404 within the first four-bar linkage.

A second four-bar linkage, in this example, comprises hinge guide 430, hinge core 402, linkage component 404, and bracket 406. In this example, hinge core 402 takes the form of a ground linkage of the second four-bar linkage, hinge guide 430 and linkage component 404 take the form of rocker linkages of the second four-bar linkage, and bracket 406 takes the form of a coupler linkage of the second four-bar linkage. The virtual pivot of bracket 406, in this example, is located at the intersection of an effective centerline of hinge guide 430 and an effective centerline of linkage component 404 within the second four-bar linkage.

A third four-bar linkage, in this example, comprises hinge guide 422, hinge core 402, linkage component 408, and bracket 410. In this example, hinge core 402 takes the form of a ground linkage of the third four-bar linkage, hinge guide 422 and linkage component 408 take the form of rocker linkages of the third four-bar linkage, and bracket 410 takes the form of a coupler linkage of the third four-bar linkage. The virtual pivot of bracket 410, in this example, is located at the intersection of an effective centerline of hinge guide 422 and an effective centerline of linkage component 408 within the third four-bar linkage.

A fourth four-bar linkage, in this example, comprises hinge guide 432, hinge core 402, linkage component 408, and bracket 410. In this example, hinge core 402 takes the form of a ground linkage of the fourth four-bar linkage, hinge guide 432 and linkage component 408 take the form of rocker linkages of the fourth four-bar linkage, and bracket 410 takes the form of a coupler linkage of the fourth four-bar linkage. The virtual pivot of bracket 410, in this example, is located at the intersection of an effective centerline of hinge guide 432 and an effective centerline of linkage component 408 within the fourth four-bar linkage.

In this example, the first and second four-bar linkages can support upper and lower portions of a flexible display on a first side of hinge core 402, and the third and fourth four-bar linkages can support upper and lower portions of the flexible display on a second side of the hinge core that opposes the first side.

Figure 5:
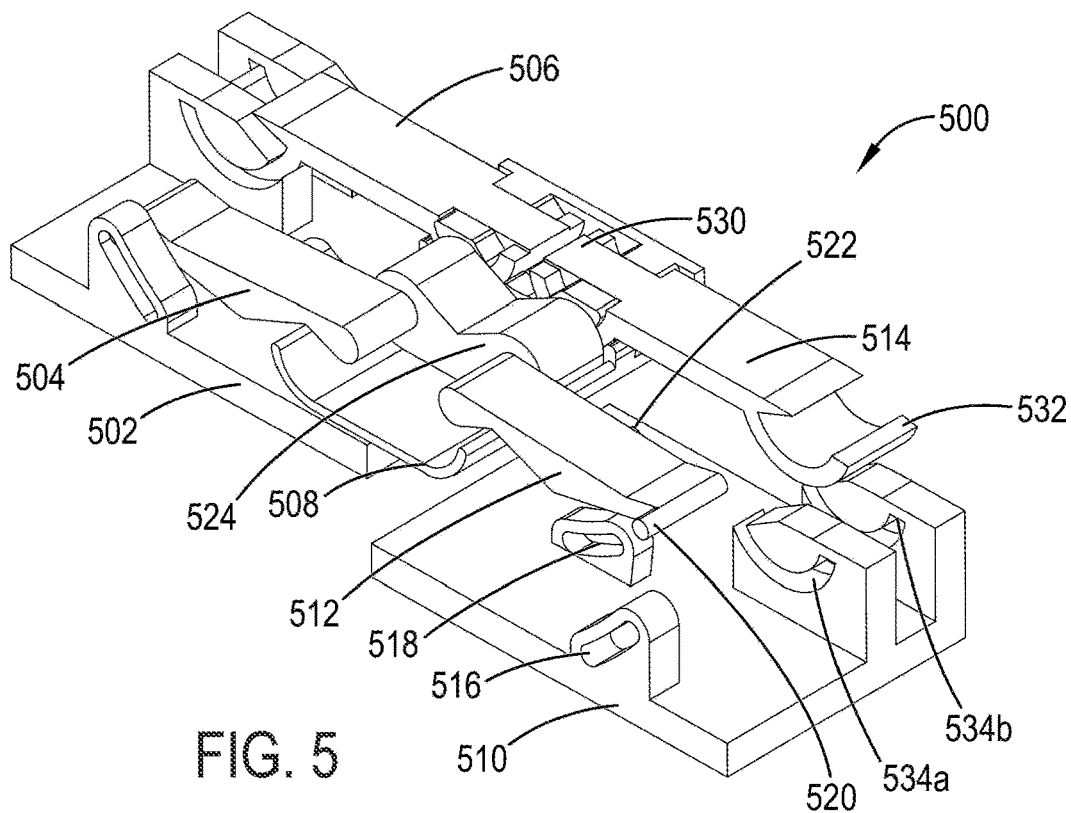
FIG. 5 shows a partially exploded view of an example linkage between a hinge core and a chassis bracket of a foldable device hinge assembly.
Figure 6:
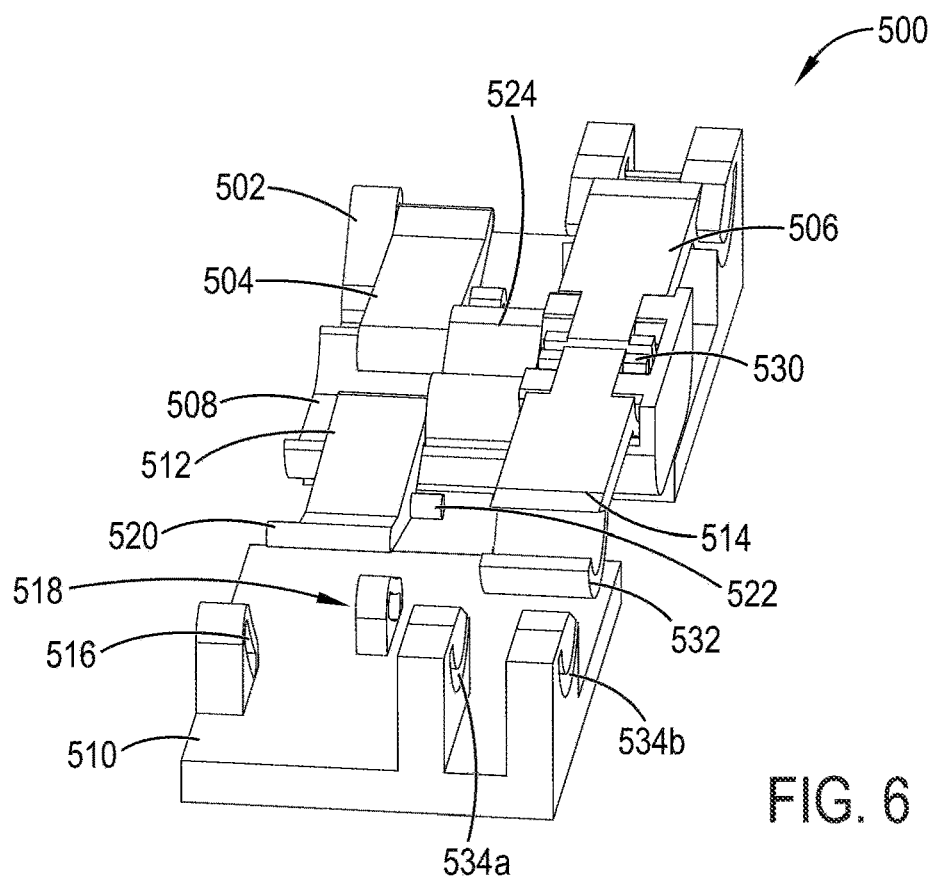
FIG. 6 shows another partially exploded view of the example linkage of FIG. 5.

FIGS. 5 and 6 show partially exploded views of an example four-bar linkage between a hinge core and a chassis bracket (e.g., a first or second portion of a computing device) for a foldable device hinge assembly 500. Hinge assembly 500 comprises a first bracket 502 (e.g., as the first portion of the computing device) connected to a first hinge guide 504 and a first linkage component 506. First hinge guide 504 and first linkage component 506 are also coupled with a hinge core 508, thereby forming a four-bar linkage including hinge core 508 and first bracket 502.

Figure 14:
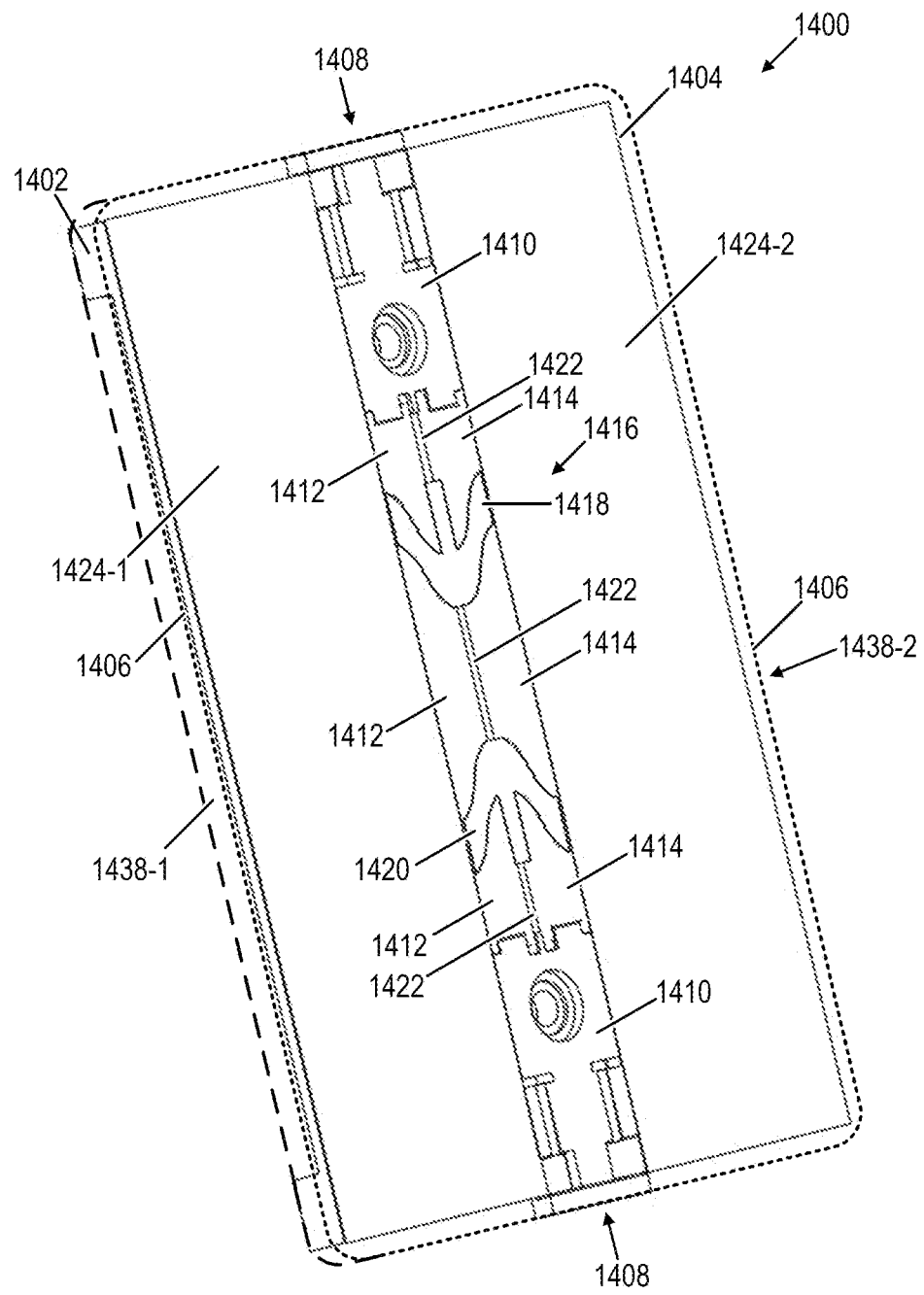
FIG. 14 shows a front side of another example computing device having a flexible display.

A second bracket 510 (e.g., as the second portion of the computing device) is shown separately from a corresponding second hinge guide 512, second linkage component 514, and hinge core 508. In FIGS. 5 and 6, first linkage component 506 and second linkage component 514 are shown in part to provide a clearer view of other components. However, first linkage component 506 and second linkage component 514 would extend substantially a length of hinge core 508 to provide backing support for a flexible display, such as depicted in FIGS. 4 and 14, for example.

Using second bracket 510 as an example, each bracket includes first slot 516 and second slot 518 into which a first pin 520 and second pin 522 of second hinge guide 512 fit. First slot 516 and second slot 518 each comprises a curved shape, but may be straight in other examples. The shape of each slot defines the path of travel and configuration of the four-bar linkage across a range of motion, thereby defining a shape or form factor of the flexible display as it is folded and unfolded. Second hinge guide 512 also comprises a third pin that fits within an opening of a corresponding receiver 524 of hinge core 508 to act as a pivot.

Further, and using second linkage component 514 as an example, each linkage component comprises a virtual pivot mechanism 530 that rotatably couples second linkage component 514 to hinge core 508. A virtual pivot mechanism, such as mechanism 530, can be used to displace a virtual pivot between two linkages (e.g., a linkage component and hinge core 508) from hardware components (e.g., the hinge core or beyond the body of the computing device). As previously described, virtual pivots of a four-bar linkage (or a multi-bar linkage of a greater quantity of linkages) can enable a greater range of backing support configurations, including a greater radius of curvature of the flexible display for a given size (e.g., thickness) of the computing device as compared to other linkage configurations.

A virtual pivot mechanism, such as mechanism 530 can also be used to increase an area over which forces are distributed at a joint of the four-bar linkage as compared to use of a smaller diameter pin. In some examples, the virtual pivot mechanism may be secured by a retaining pin. Likewise, each linkage component includes a semicircular connector 532, as an example of virtual pivot mechanism 530, that fits within complementary slots 534a, 534b on the corresponding bracket 510. In this example, the virtual pivot enabled by the virtual pivot mechanism is provided by a radius of curvature of semicircular connector 532 and of complementary slots 534a and 534b being greater than a size of the hardware components (e.g., the hinge core or the body of the computing device).

The semicircular connector 532 and complementary slots 534a, 534b allow second linkage component 514 to pivot relative to a chassis portion attached to or integrated with second bracket 510. This allows display backing support surfaces of second linkage component 514 and a chassis portion attached to second bracket 510 to be coplanar in an open/unfolded configuration, and to be angled in a closed/folded configuration to allow a flexible display to have a curved, "teardrop" shape. This "teardrop" shape of the flexible display can provide increased longevity and reduced wear of the flexible display over a number of opening and closing cycles as compared to alternative configurations in which a flexible display has a sharper bend or crease in the closed/folded configuration of the computing device. Additionally, as discussed above, this "teardrop" shape of the flexible display can enable other components of the computing device to be located on a rear side of the flexible display due to narrowing of a distance between opposing sides of the flexible display at regions remotely located from the spine and hinge assembly.

Figure 7:
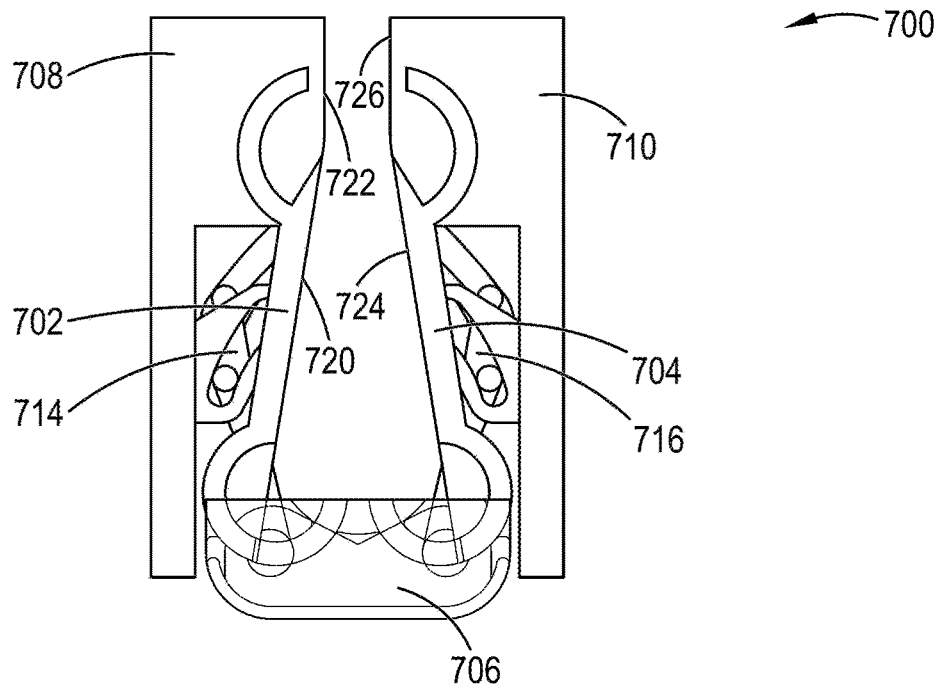
FIG. 7 shows an example hinge assembly for a foldable device in a closed/folded configuration.
Figure 8:
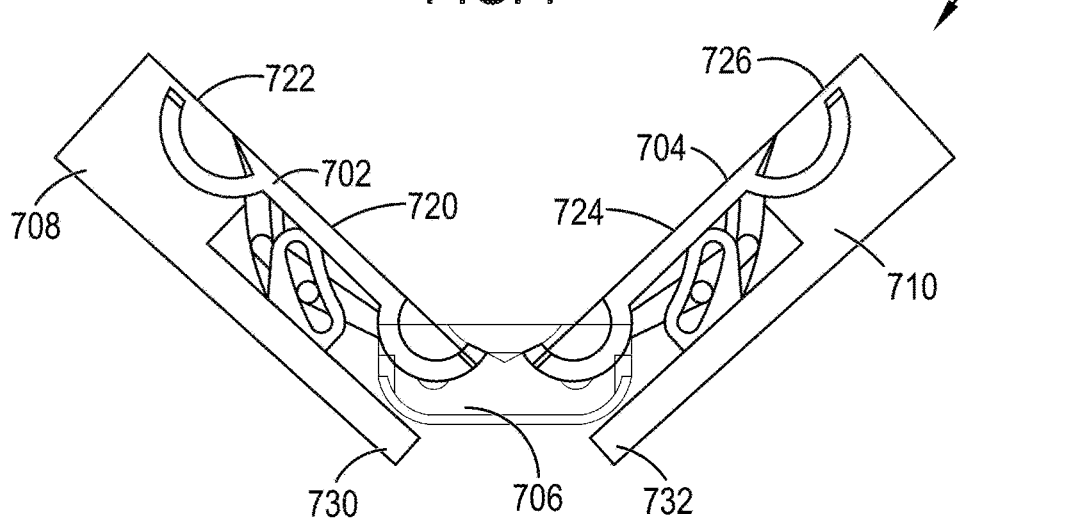
FIG. 8 shows the example hinge assembly of FIG. 7 in a partially open configuration.
Figure 9:
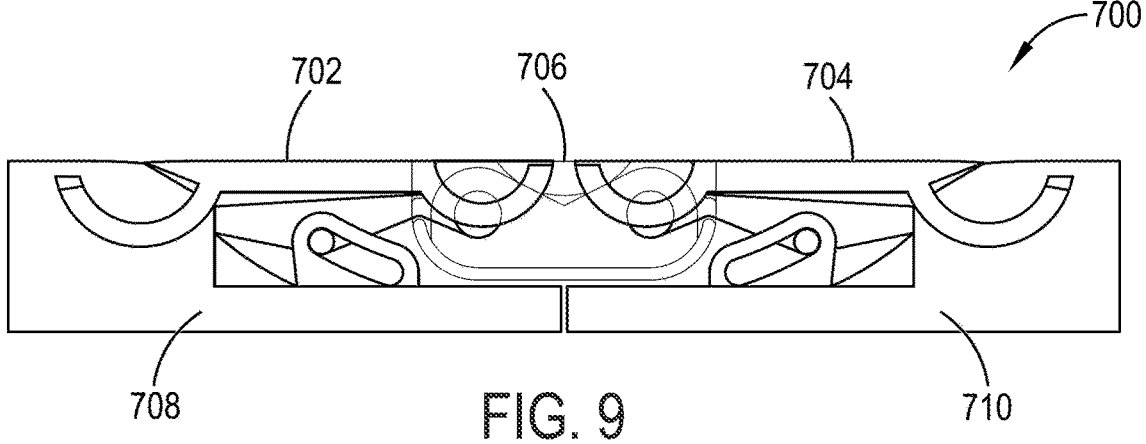
FIG. 9 shows the example hinge assembly of FIG. 7 in a fully open configuration.

FIGS. 7-9 illustrate operation of an example hinge assembly 700 for a foldable computing device (e.g., a mobile device). FIG. 7 shows the example hinge assembly in a closed/folded configuration. FIG. 8 shows the example hinge assembly of FIG. 7 in a partially open configuration. FIG. 9 shows the example hinge assembly of FIG. 7 in a fully open configuration. Hinge assembly 700 comprises a first linkage component 702, a second linkage component 704, a hinge core 706, a first bracket 708, a second bracket 710, a first hinge guide 714, and a second hinge guide 716.

First referring to FIG. 7, a display backing support surface 720 of first linkage component 702 has an angle relative to a display backing support surface 722 of first bracket 708. Likewise, a display backing support surface 724 of second linkage component 704 has an angle to a display backing support surface 726 of second bracket 708. This allows a flexible display to have a curved, "teardrop" shape when hinge assembly 700 in in a closed/folded configuration, as explained above. Further, the outer surfaces of first bracket 708 and second bracket 710 are generally parallel to one another such that a computing device comprising hinge assembly 700 folds into a generally flat shape.

Referring next to FIG. 8, as hinge assembly 700 moves into an open/unfolded configuration, display backing support surface 720 of first linkage component 702 moves toward becoming coplanar with display backing support surface 722 of first bracket 708. Likewise, display backing support surface 724 of second linkage component 702 moves toward becoming coplanar with display backing support surface 726 of second bracket 710. Further, hinge core 706 moves upwardly between first bracket 708 and second bracket 710. This allows an end 730 of first bracket 708 and an end 732 of second bracket 710 to move toward one another behind hinge core 706.

Referring next to FIG. 9, in the fully open/unfolded configuration, first linkage component 702, second linkage component 704, hinge core 706, first bracket 708, and second bracket 710 form a generally flat backing surface for a flexible display. Further, end 730 of first bracket 708 and end 732 of second bracket 710 cover a substantial portion of hinge core 706 on an opposing side of hinge assembly 700 from a display side.

Figure 10:
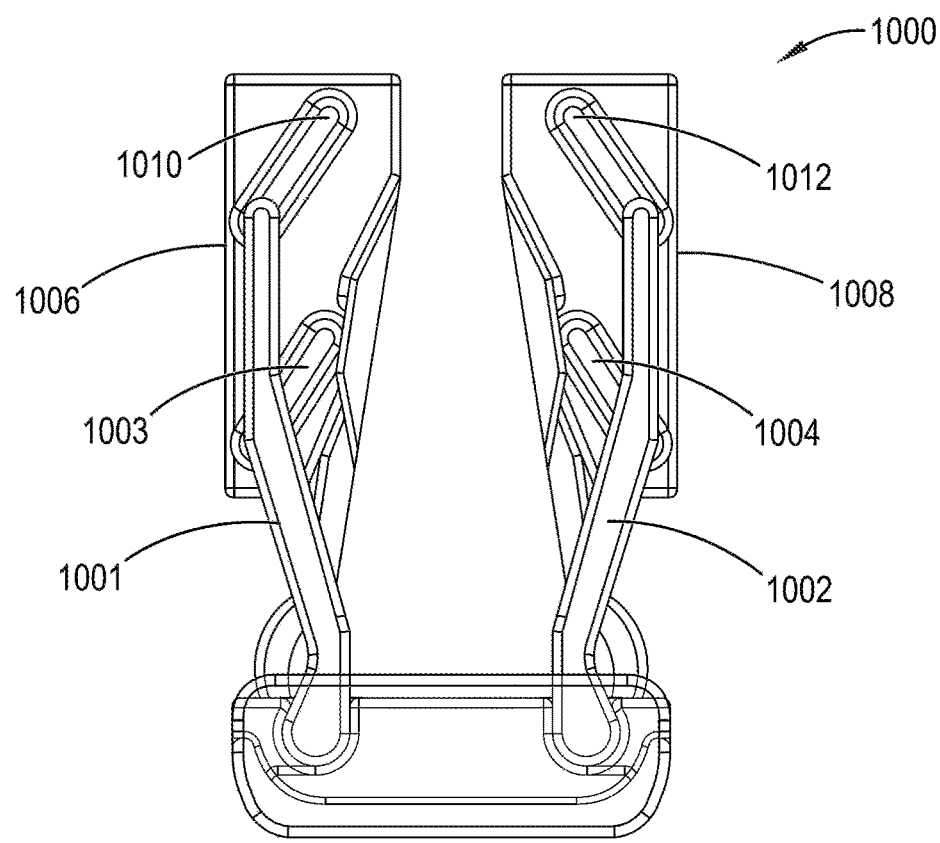
FIG. 10 shows example hinge guides for another example hinge assembly.

As mentioned above, in some examples, a hinge guide may be inserted into and move within an uncurved slot, instead of a curved slot. FIG. 10 shows example hinge guides 1001, 1002 for another example hinge assembly 1000, wherein hinge guides 1001, 1002 comprise protrusions that move within straight slots. More particularly, hinge guides 1001, 1002 comprise protrusions including respective first pins that fits within respective uncurved first slots 1003, 1004 on respective brackets 1006, 1008. Hinge guides 1001, 1002 further comprise respective second pins that fits within uncurved second slots 1010, 1012 on respective bracket 1006, 1008.

In each of the above example hinges, the slots in which the pins of the hinge guides fit are oriented non-parallel with respect to a flexible display when the hinge is in a fully open/unfolded configuration. Such an orientation of slots allows the hinge core in each example to move toward a plane of the display backing surfaces of the first and second brackets when the hinge is moved toward the open/unfolded configuration. In other examples, any other suitable mechanism with a degree of freedom that is not parallel to the display when open may be used instead of, or in addition to, the depicted hinge guides. Examples include sublinkages and/or flexures.

Figure 11:
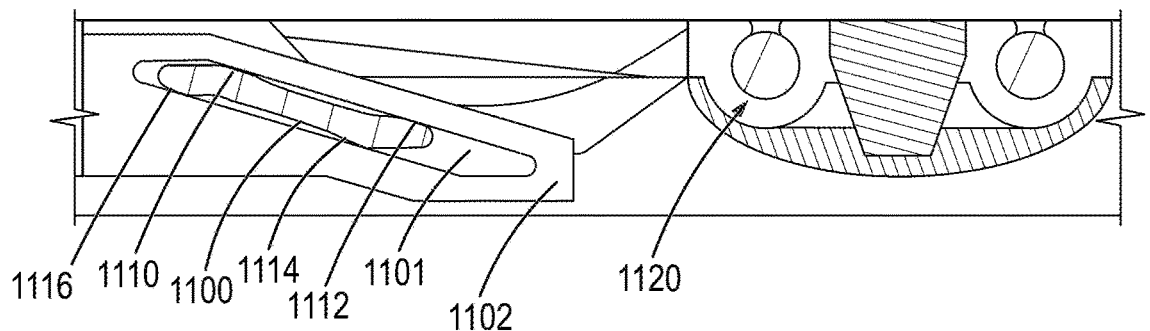
FIG. 11 shows example hinge guides for another example hinge assembly, and also shows an example integrated friction engine.

In each of the above example hinges, the hinge guides comprise pins that fit into corresponding slots. However, in other examples, a hinge guide may have any other suitable configuration. FIG. 11 shows four views of a hinge guide 1100 for another example hinge assembly. Hinge guide 1100 comprises an elongate protrusion that fits into an uncurved slot 1101 of a bracket 1102. As previously described, an elongate protrusion having multiple contact surfaces can be used to restrict rotation of the protrusion within a slot as compared to a pin. The elongate protrusion of hinge guide 1100 comprises two contact surfaces 1110, 1112 configured to contact a first side of slot 1101, and two contact surfaces 1114, 1116 configured to contact a second side of slot 1101. Contact surfaces contact surfaces 1110 and 1112, and contact surfaces 1114 and 1116 are separated by spaces with some surface relief. The use of contact surfaces separated by areas with surface relief may reduce binding of the elongate protrusion within the slot, and can facilitate manufacturing hinge guide 1100 as compared with alternative configurations in which surfaces are in continuous contact along each side of slot 1101, without surface relief. FIG. 11 also illustrates an example integrated friction engine 1120.

In some examples, a timing mechanism may be used to synchronize motion of the first and second portions of a computing device relative to a hinge core. As an example, the timing mechanism coordinates rotation of the first portion relative to the hinge core with rotation of the second portion relative to the hinge core. By coordinating rotation of the first and second portions relative to each other, symmetrical configurations of the flexible display about the hinge assembly can be achieved in both the closed/folded configuration and the open/unfolded configuration. Additionally, such coordination by way of the timing mechanism can serve to maintain one of the first or second portions of the computing device at a fixed position relative to the hinge core by a user holding the other of the first or second portions at a fixed position relative to the hinge core. Thus, a particular positioning of the flexible display can be maintained without necessarily requiring the user to hold both the first and second portions of the computing device.

Any suitable timing mechanism may be used, including the example timing mechanisms of FIGS. 12, 14, 21, and 25 as examples. The timing mechanism can coordinate rotation of the first and second portions relative to the hinge core via the first and second linkage components, as described with reference to FIG. 14, as an example. The timing mechanism can coordinate rotation of the first and second portions relative to the hinge core via the first and second hinge guides, as described with reference to FIGS. 12 and 21, as additional examples.

Figure 12:
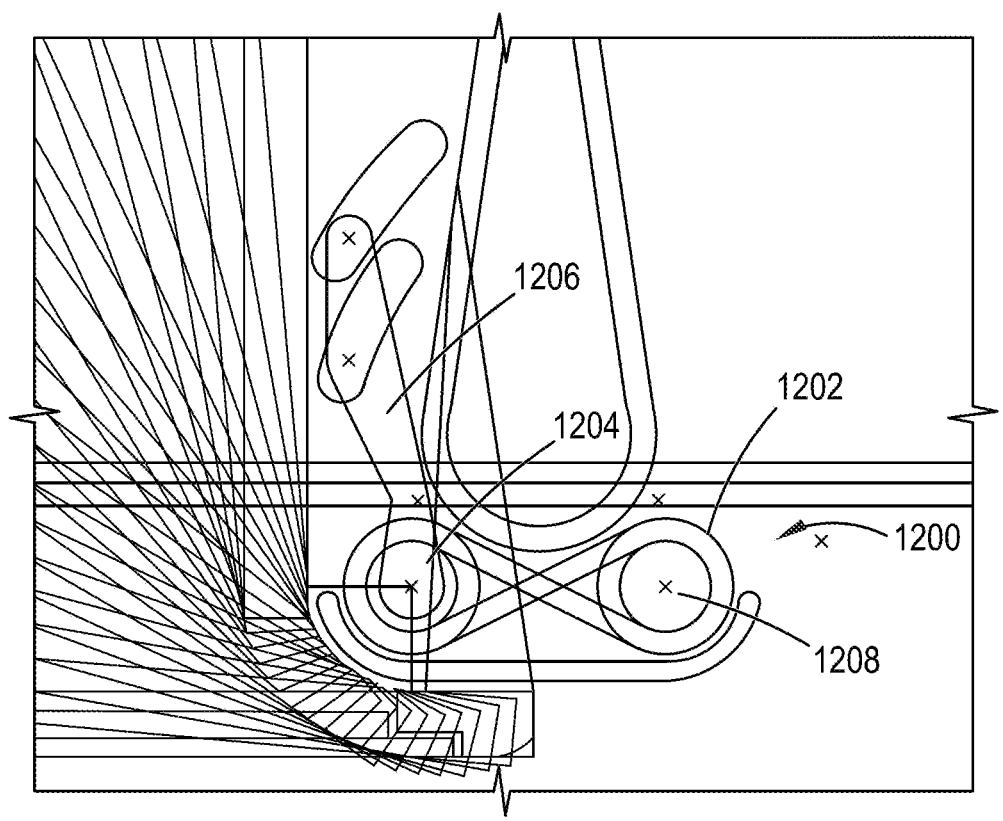
FIG. 12 schematically shows aspects of an example hinge assembly comprising a cable timing mechanism.
Figure 21:
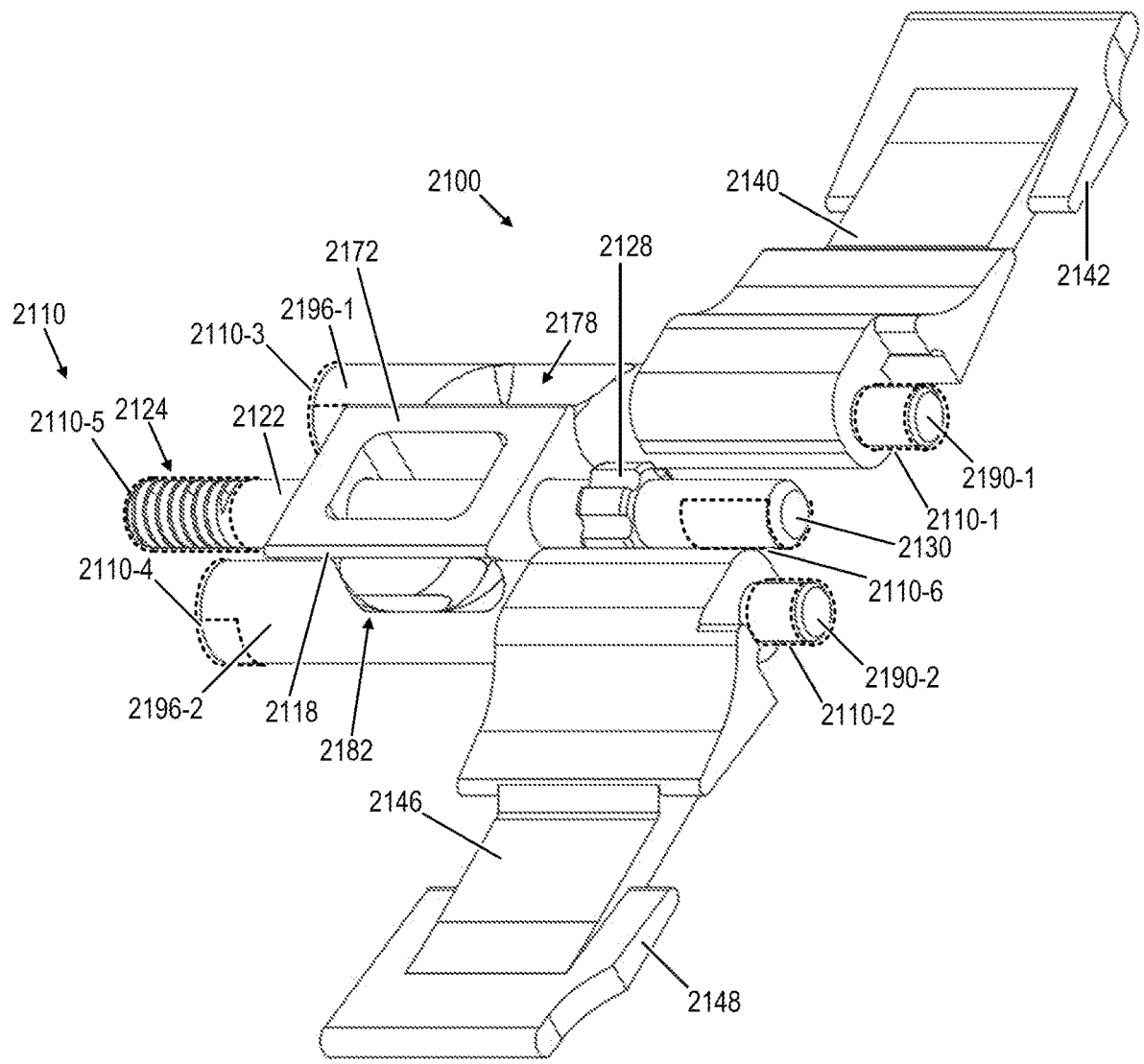
FIG. 21 shows an example timing mechanism corresponding to an open/unfolded configuration for a computing device having a flexible display.

FIG. 12 shows aspects of an example hinge assembly comprising a cable timing mechanism 1200. Cable timing mechanism 1200 comprises a cable 1202 arranged in a figure eight path around a pivot 1204 for a first hinge guide 1206, and around a pivot 1208 for a second hinge guide (not shown). The figure eight path of cable 1202 results in the first and second portions of a computing device to move synchronously in opposite directions as the computing device is opened and closed. The cable timing mechanism is one example of a timing mechanism that can be used to coordinate rotation of a first portion of a computing device relative to a hinge core with rotation of a second portion of the computing device relative to the hinge core. Use of the cable timing mechanism may be suitable for scenarios in which the manufacture of helical timing mechanisms (e.g., as shown in the examples of FIGS. 14 and 21) is more complex or more costly, for example, depending on tooling availability.

Figure 13:
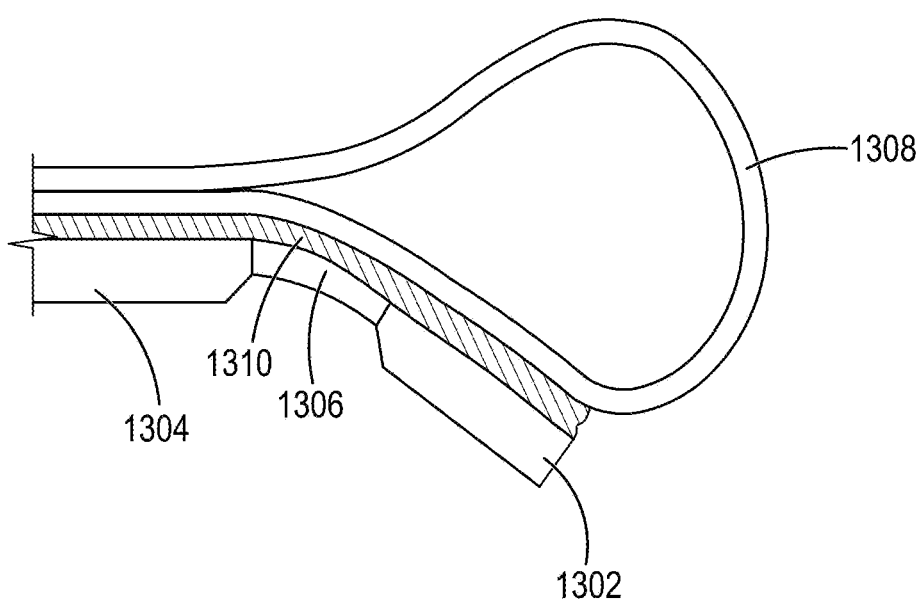
FIG. 13 shows aspects of an example hinge assembly comprising a living hinge.

In some examples, a hinge mechanism may comprise a living hinge. The use of a living hinge may allow a flexible display to be adhered to multiple structures forming a display backing support surface (e.g. first and second linkage components, first and second brackets, hinge core, etc.) with a contiguous layer of adhesive (e.g. single piece of pressure sensitive adhesive), as the living hinge may avoid abrupt joints between adjacent display backing support surfaces. FIG. 13 shows an example living hinge, and illustrates a smooth curvature between a linkage component 1302 and a bracket 1304 connected by the living hinge 1306. As such, flexible display 1308 is adhered to these components with a contiguous adhesive layer 1310. Living hinge 1306 also may help to prevent backlash. Living hinge 1306 may be formed from any suitable material. Examples include suitable metals or polymers that are suitably flexible and/or elastic. In some examples, a living hinge may provide spring force to help open a computing device. Further, in some examples, a flexible display may act as a living hinge, without a separate flexible piece. In some examples, a living hinge can replace the joint represented by 532/534a/534b in FIG. 5 above. In such an example, the living hinge not only provides a smooth transition for supporting the display, but also eliminates joint features.

The disclosed examples may provide for a relatively flat, thin computing device when in a folded configuration compared to current foldable devices. Further, the disclosed example hinge assemblies may be relatively lower cost due to the reduced number of parts achieved by combining linkage and display backing support functionalities in components. Also, the disclosed examples may help to reduce a number of gaps and steps under a display, thereby feeling more consistently flat, supported and smooth for touch inputs. The disclosed examples further may help to increase a maximum bend radius of a flexible display.

FIGS. 14-20 show features of another example computing device 1400 that incorporates at least some of the features previously described with reference to FIGS. 1-13. Computing device 1400 includes a first portion 1402, a second portion 1404, a hinge assembly 1405 that rotatably couples the first portion to the second portion, and a flexible display 1406. Flexible display 1406 extends at least partially across first portion 1402 and at least partially across second portion 1404, and spans hinge assembly 1405. FIG. 14 shows a front side of computing device 1400 in which flexible display 1406 is represented using wireframe having a broken line of a first type to reveal other components of computing device 1400.

In an example, first portion 1402 takes the form of a first bracket by which flexible display 1406 is coupled to a first frame portion or chassis (represented schematically in FIG. 14 at 1438-1 by a broken line of a second type) of computing device 1400, and second portion 1404 takes the form of a second bracket by which flexible display 1406 is coupled to a second frame portion or chassis (indicated generally at 1438-2 in FIG. 14) of the computing device. In another example, first portion 1402 is integrated with the first frame portion or chassis of computing device 1400, and second portion 1404 is integrated with second frame portion or chassis of the computing device.

Hinge assembly includes a hinge core 1410. As an example, hinge assembly 1408 rotatably couples first portion 1402 to second portion 1404 via hinge core 1410, enabling computing device 1400 to assume a variety of configurations. Computing device 1400 is shown configured in an open/unfolded configuration in FIGS. 14-17, and in a closed/folded configuration in FIG. 20.

Figure 20:
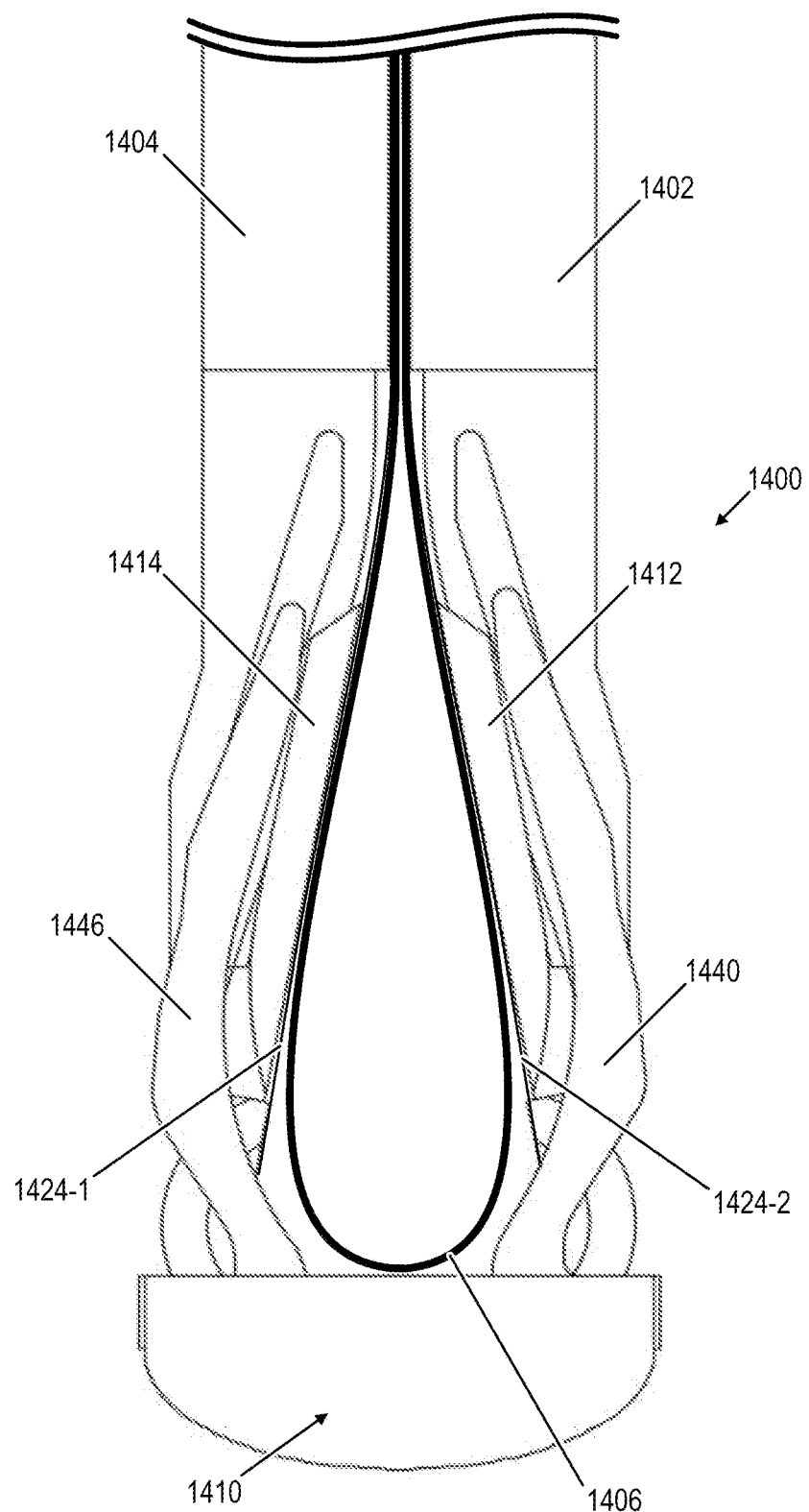
FIG. 20 shows the computing device of FIG. 14 in a closed/folded configuration as viewed along the axis of FIG. 16.

In the open/unfolded configuration, as shown in FIGS. 14-17, flexible display 1406 of computing device 1400 is planar or substantially planar. In the closed/folded configuration shown in FIG. 20, opposing sides of flexible display 1406 that extend across first portion 1402 and across second portion 1404, respectively, are rotated toward each other such that a display surface of the flexible display is located on an inward-facing or concave side of the computing device. The flexibility of display 1406 allows the display to bend to adapt to a relative angle of first portion 1402 to second portion 1404. For example, FIG. 20 shows flexible display 1406 having a curved, "teardrop" shape in the closed/folded configuration of computing device 1400.

Computing device 1400 may take any suitable form, such as previously described with reference to computing device 100 of FIG. 1. Examples of computing device 1400 include hand-held and/or mobile devices, such as a foldable smart phone or a foldable tablet computer. Display 1406 may comprise any suitable type of flexible display. In some examples, display 1406 comprises a flexible OLED display. In some examples, display 1406 may include an integrated touch sensor to sense touch inputs, such as one or more digits of a user and/or a stylus.

As shown in FIG. 14, hinge assembly 1408 comprises a first linkage component 1412 connecting hinge core 1410 to first portion 1402 of computing device 1400. First linkage component 1402 forms a portion of a backing support (shown in FIG. 16 at 1428) for flexible display 1406. Hinge assembly 1408 comprises a second linkage component 1414 connecting hinge core 1410 to second portion 1404 of computing device 1400. Second linkage component 1414 forms another portion of the backing support for flexible display 1406.

In this example, first portion 1402 is rotatably coupled to first linkage component 1412 via a living hinge formed by a first flexible sheet 1424, and second portion 1404 is rotatably coupled to second linkage component 1414 via a living hinge formed by a second flexible sheet 1426. Examples of suitable living hinges are described with reference to FIG. 13. In at least some examples, first flexible sheet 1424 and second flexible sheet 1426 may form part of the same continuous sheet that spans hinge assembly 1408. First flexible sheet 1424-1 and second flexible sheet 1424-2 may form a backing of flexible display 1406, in at least some examples. As previously described, flexible sheets of a living hinge, such as 1424-1 and 1424-2 may be formed from a metal or a polymer, as examples. While living hinges are used in this example to couple first portion 1402 to first linkage component 1412 and to couple second portion 1404 to second linkage component 1414, it will be understood that other suitable configurations may be used, such as a pinned connection or a semicircular connector that fits within a complementary slot, as described with reference to FIGS. 5 and 6, as examples.

Computing device 1400 includes a timing mechanism 1416 that coordinates (e.g., synchronizes) rotation of first portion 1402 relative to hinge core 1410 with rotation of second portion 1404 relative to the hinge core. As previously described, by coordinating rotation of first and second portions of the computing device relative to each other, symmetrical configurations of the flexible display about the hinge assembly can be achieved in both the closed/folded configuration and the open/unfolded configuration. Additionally, such coordination by way of the timing mechanism can serve to maintain one of the first or second portions of the computing device at a fixed position relative to the hinge core by a user holding the other of the first or second portions at a fixed position relative to the hinge core.

In the example of FIG. 14, a first helical timing element 1418 and a second helical timing element 1420 of timing mechanism 1416 each interface with first linkage component 1412 and second linkage component 1414 to coordinate rotation of first portion 1402 with second portion 1404. Thus, in this example, timing mechanism 1416 includes at least first helical timing element 1418, second helical timing element 1420, first linkage component 1412, and second linkage component 1414. First helical timing element 1418 and second helical timing element 1420 can each form a portion of the backing support for flexible display 1406, thereby enabling the timing mechanism of the computing device to provide multiple functions that can serve to reduce a quantity of components of the computing device and/or the overall size of the computing device. Timing mechanism 1416 is shown in further detail with reference to FIGS. 18 and 19.

In this example, first helical timing element 1418 and a second helical timing element 1420 translate along a guide portion 1422 of hinge core 1410. Rotation of first linkage component 1412 relative to second linkage component 1414 induces translation of helical timing elements 1418 and 1420 relative to hinge core 1410 in a first dimension along a spine of the foldable computing device via guide portion 1422. Additionally, rotation of first linkage component 1412 relative to second linkage component 1414 induces translation helical timing elements 1418 and 1420 in a second dimension relative to the flexible display (e.g., toward or away from the flexible display) that is orthogonal to the first dimension.

As an example, in the open/unfolded configuration of FIG. 14, helical timing elements 1418 and 1420 are translated toward the flexible display and form a portion of a backing support for the flexible display. In the closed/folded configuration of FIG. 20, helical timing elements 1418 and 1420 as well as hinge core 1410 are translated away from the flexible display, enabling first linkage component 1412 and second linkage component 1414 to move inward to reduce an overall thickness of the computing device in the closed/folded configuration, as shown in FIG. 20. Thus, the combined motion of the helical timing elements enables the helical timing elements to contribute to planar backing support for the flexible display in the open/unfolded configuration, while also moving rearward from the display surface in the closed/folded configuration to provide for a thinner computing device form factor for a given curvature of the flexible display.

Figure 15:
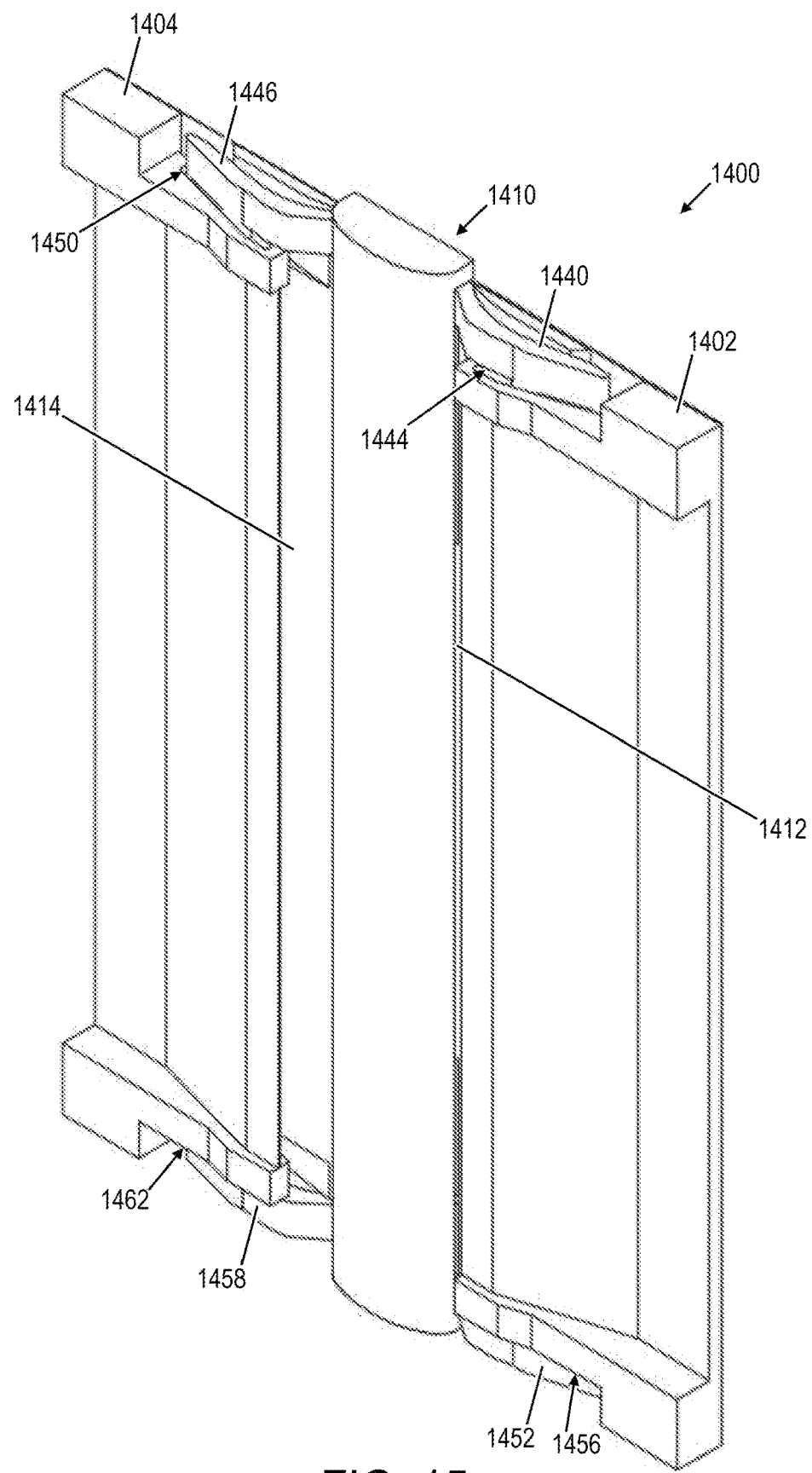
FIG. 15 shows a rear side of the computing device of FIG. 14

FIG. 15 shows a rear side of computing device 1400 in the open/unfolded configuration of FIG. 14. As shown in FIG. 15, computing device 1400 further includes a first hinge guide 1440 that is rotatably coupled to hinge core 1414. First hinge guide 1440 comprises a protrusion 1442 (shown in FIG. 17) that fits into a first hinge guide slot 1444 defined by first portion 1402. Protrusion 1442 of first hinge guide 1440 translates along first hinge guide slot 1444 as first portion 1402 is rotated relative to hinge core 1414.

Computing device 1400 further includes a second hinge guide 1446 that is rotatably coupled to hinge core 1414. Second hinge guide 1446 comprises a protrusion 1448 (shown in FIG. 17) that fits into a second hinge guide slot 1450 defined by second portion 1404. Protrusion 1448 of second hinge guide 1446 translates along second hinge guide slot 1450 as second portion 1404 is rotated relative to hinge core 1414.

Computing device 1400 further includes a third hinge guide 1452 that is rotatably coupled to hinge core 1414. Third hinge guide 1452 comprises a protrusion similar to protrusion 1442 of first hinge guide 1440 that fits into a third hinge guide slot 1456 (shown in FIG. 18) defined by first portion 1402. The protrusion of third hinge guide 1452 translates along third hinge guide slot 1456 as first portion 1402 is rotated relative to hinge core 1414.

Computing device 1400 further includes a fourth hinge guide 1458 that is rotatably coupled to hinge core 1414. Fourth hinge guide 1458 comprises a protrusion similar to protrusion 1448 of second hinge guide 1446 that fits into a fourth hinge guide slot 1462 (shown in FIG. 18) defined by second portion 1404. The protrusion of fourth hinge guide 1458 translates along fourth hinge guide slot 1462 as second portion 1404 is rotated relative to hinge core 1414.

Figure 16:
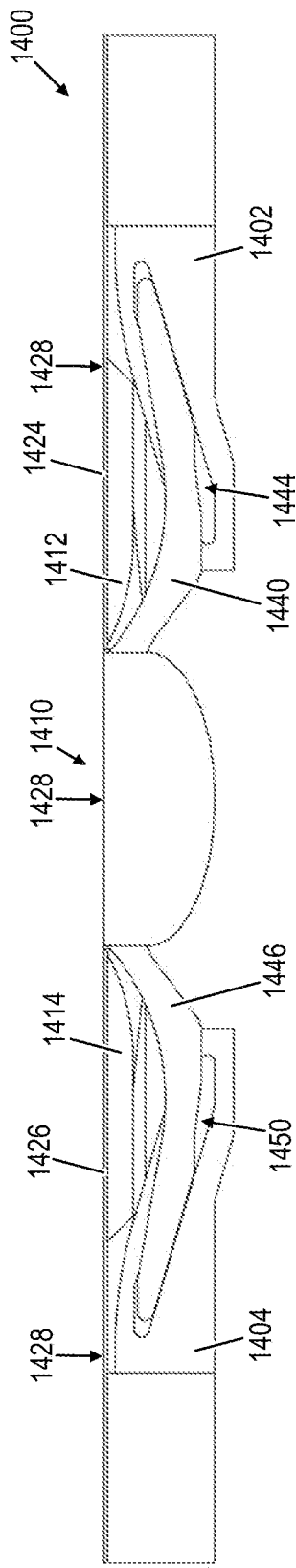
FIG. 16 shows the computing device of FIG. 14 as viewed along an axis that is parallel to axes of rotation of a first portion and a second portion relative to a hinge.

FIG. 16 shows computing device 1400 as viewed along an axis that is parallel to axes of rotation of first portion 102 and second portion 104 via hinge assembly 1408. Within FIG. 16, the backing support for flexible display 1406 is depicted at 1428 for the open/unfolded configuration of the computing device. Backing support 1428 in the open/unfolded configuration shown in FIG. 16 is collectively formed by surfaces of hinge core 1410, first linkage component 1424, second linkage component 1426, first portion 1402, and second portion 1404. Where a live hinge is used (e.g., 1424-1 and 1424-2), the live hinge may reside between backing support 1428 and flexible display 1406.

Also within FIG. 16, first hinge guide 1440, first hinge guide slot 1444, second hinge guide 1446, and second hinge guide slot 1450 are shown in further detail. Third hinge guide 1452 and third hinge guide slot 1456 may have a similar shape as second hinge guide 1440 and second hinge guide slot 1444, respectively. Fourth hinge guide 1458 and fourth hinge guide slot 1462 may have a similar shape as first hinge guide 1440 and first hinge guide slot 1444, respectively. Each of these hinge guide slots are oriented non-parallel with respect to the flexible display when the computing device is in the open/unfolded configuration depicted in FIG. 16. Such an orientation of the hinge guide slots allows the hinge core in each example to move toward a plane of the display backing surface 1428 when the hinge is moved toward the open/unfolded configuration.

Figure 17:
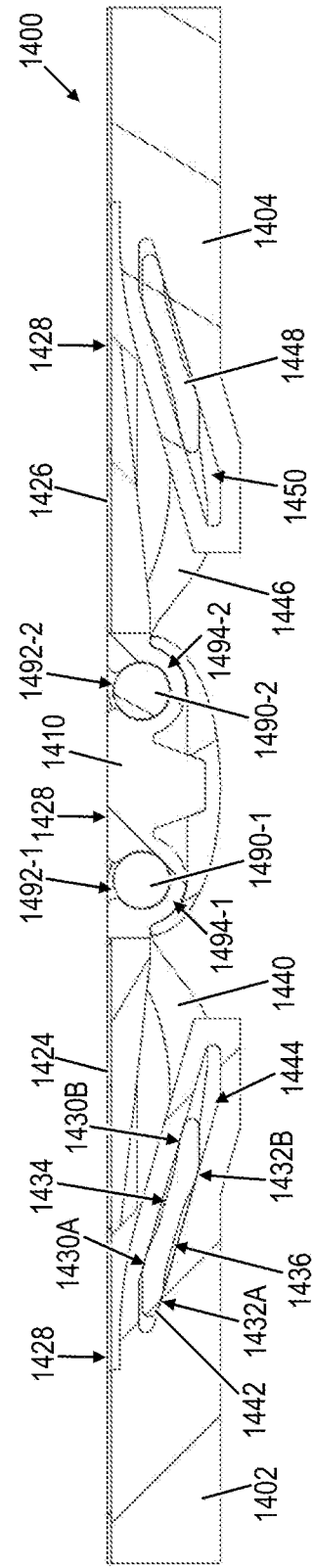
FIG. 17 is a section view of the computing device of FIG. 14.

FIG. 17 is a section view of computing device 1400 as viewed in an opposite direction from FIG. 16 through first protrusion 1442 of first hinge guide 1440 and through second protrusion 1450 of second hinge guide 1446. As previously described with reference to FIG. 11, a protrusion of a hinge guide that fits within a hinge guide slot may take the form of an elongate protrusion, and the hinge guide may take the form of an uncurved slot that enables the elongate protrusion to translate back and forth along an uncurved, linear path of travel.

In the open/unfolded configuration shown in FIG. 17, first protrusion 1442 and second protrusion 1448 are extended outward along their respective hinge guide slots 1444 and 1450, thereby retracting first portion 1402 and second portion 1404 inward toward hinge core 1410. When first portion 1402 and second portion 1404 are rotated relative to hinge core 1410 from the open/unfolded configuration shown in FIG. 17 toward the closed/folded configuration, first protrusion 1442 and second protrusion 1448 translate inward along their respective hinge guide slots 1444 and 1450, thereby extending first portion 1402 and second portion 1404 outward and away from hinge core 1410.

As described with reference to hinge guide 1440, as an example, protrusion 1442 takes the form an elongate protrusion and first hinge guide slot 1444 takes the form of an uncurved slot. Protrusion 1442 includes two contact surfaces 1430A and 1430B that interface with a first side of first hinge guide slot 1444, and two contact surfaces 1432A and 1432B that interface with a second side of first hinge guide slot 1444. Contact surfaces 1430A and 1430B are separated by a first region 1434 of surface relief on a first side of protrusion 1442, and contact surfaces 1432A and 1432B are separated by a second region of surface relief 1436 on a second side of protrusion 1442. Protrusion 1460 of fourth hinge guide 1458 may have a similar shape as protrusion 1442 of first hinge guide 1440. Protrusion 1454 of third hinge guide 1452 may have a similar shape as protrusion 1448 of second hinge guide 1446, depicted in FIG. 17, which also features contact surfaces that are separated by regions of surface relief.

A first pair of contact surfaces, such as contact surface 1430A and contact surface 1432A located on opposing sides of the protrusion form a first follower of the hinge guide with respect to the hinge guide slot. A second pair of contact surfaces, such as contact surface 1430B and contact surface 1432B located on opposing sides of the protrusion form a second follower of the hinge guide with respect to the hinge guide slot. By spacing the first pair of contact surfaces apart from the second pair of contact surfaces, the hinge guide may provide similar functionality as first pin 520 and second pin 522 of hinge guide 512 of FIGS. 5 and 6, which are also spaced apart from each other along a length dimension of the hinge guide. Additionally, the use of contact surfaces separated by regions of surface relief for protrusions of hinge guides may facilitate manufacturing by reducing or eliminating binding of the protrusion within the slot that may otherwise occur in the absence of the surface relief.

As shown in FIG. 17, first hinge guide 1440 includes an axle 1490-1 or other suitable structure by which the first hinge guide is rotatably coupled to hinge core 1410. In this example, hinge core defines a receptacle 1492-1 within which axle 1490-1 may rotate. Receptacle 1492-1 and axle 1490-1 may form a first integrated friction engine 1494-1, such as previously described with reference to FIG. 11. As an example, surfaces of receptacle 1492-1 that interface with surfaces of axle 1490-1 may be configured (e.g., sized and/or shaped) to induce friction or drag of a predefined magnitude on first hinge guide 1440 across a range of rotation to provide a suitable resistance to folding and unfolding of computing device 1400 between open and closed configurations. The use of a friction engine may also serve to reduce backlash, in at least some examples. Hinge guides 1446, 1452, and 1458 may be similarly rotatably coupled to hinge core 1410 by a respective axle or other suitable structure of the hinge guide and a receptacle of the hinge core to form an integrated friction engine. For example, hinge guide 1446 is shown in FIG. 17 having an axle 1490-2 that rotates within a second receptacle 1492-2 of hinge core 1410 to form a second integrated friction engine 1494-2. A third receptacle 1492-3 for third hinge guide 1452 and a fourth receptacle 1492-4 for fourth hinge guide 1458 are shown in FIG. 18.

In another example, each of hinge guides 1440, 1446, 1452, and 1458 may be rotatably coupled to hinge core 1410 via a semicircular connector and corresponding semicircular slot, such as previously described with reference to FIG. 5. In this configuration, hinge guides 1440, 1446, 1452, and 1458 can each include a semicircular connector, and hinge core 1410 can include a respective semicircular slot for each hinge guide that accommodates the semicircular connector of that hinge guide.

Figure 18:
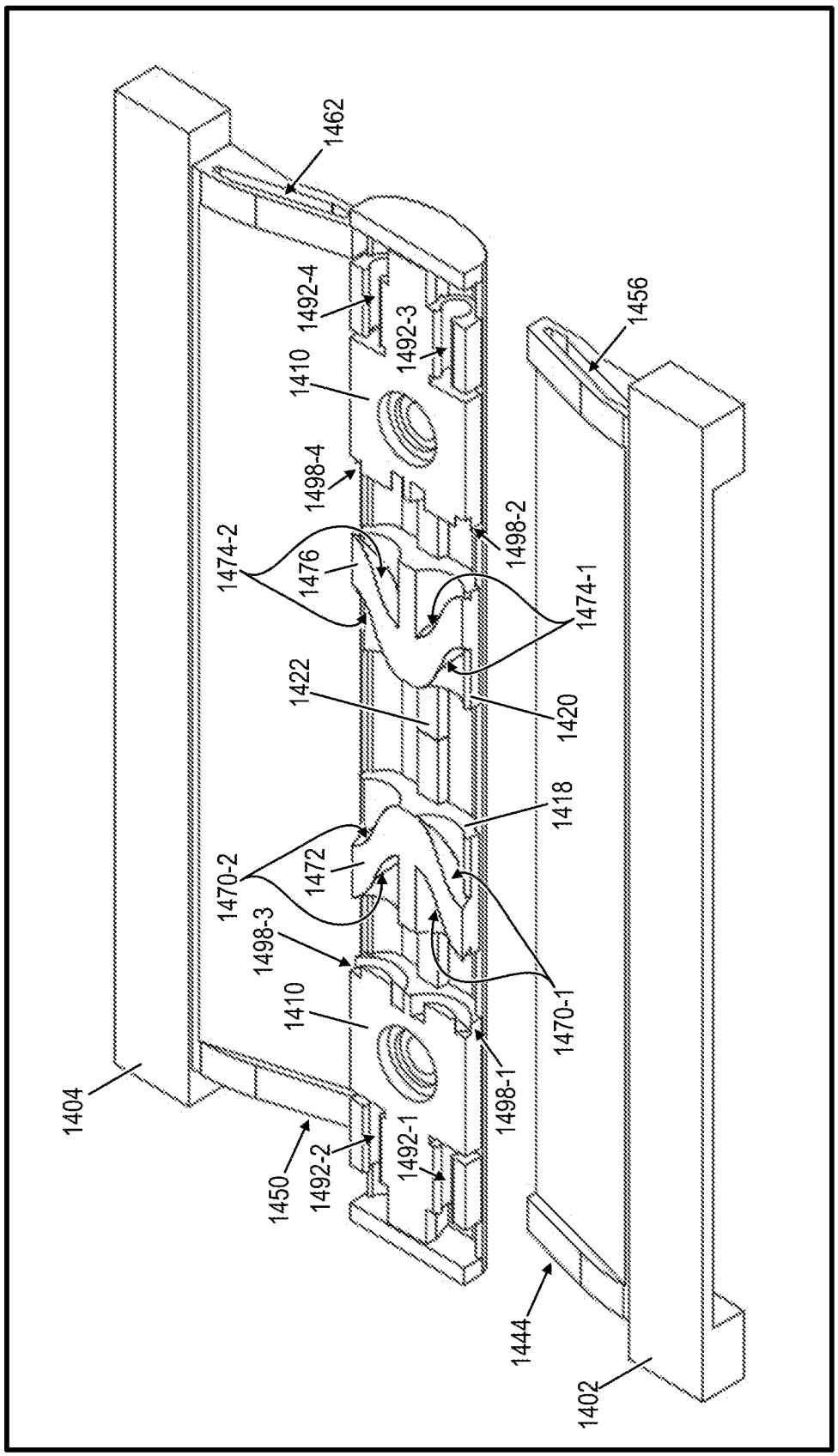
FIG. 18 shows features of the computing device of FIG. 14 along a front side of the computing device without linkage components and without hinge guides.

Referring to FIG. 18, features of computing device 1400 are shown along a front side of the computing device without linkage components 1412, 1414 and without hinge guides 1440, 1446, 1452, 1458. Within FIG. 18, guide portion 1422 is shown in further detail. In this example, guide portion 1422 forms a rail upon which first helical timing element 1418 and second helical timing element 1420 ride, thereby constraining motion of the helical timing elements along an axis that is parallel to a rotation axis of the hinge. The use of helical surfaces as part of a timing mechanism can serve to increase the area over which forces are applied within the timing mechanism, which can increase strength and longevity of the timing mechanism.

First helical timing element 1418 includes a first set of one or more helical surfaces 1470-1, a second set of one or more helical surfaces 1470-2, and a planar surface 1472. Planar surface 1472 can form a portion of backing surface 1428 for flexible display 1406 that contributes to supporting the flexible display in the open/unfolded configuration to provide for a flat display surface. Similarly, second helical timing element 1420 includes a first set of one or more helical surfaces 1474-1, a second set of one or more helical surfaces 1474-2, and a planar surface 1476. Planar surface 1476 can form another portion of backing surface 1428 for flexible display 1406 that contributes to supporting the flexible display in the open/unfolded configuration to provide for a flat display surface. In this example, first helical timing element 1418 and second helical timing element 1420 have an identical shape, but are arranged in opposing directions relative to each other.

Figure 19:
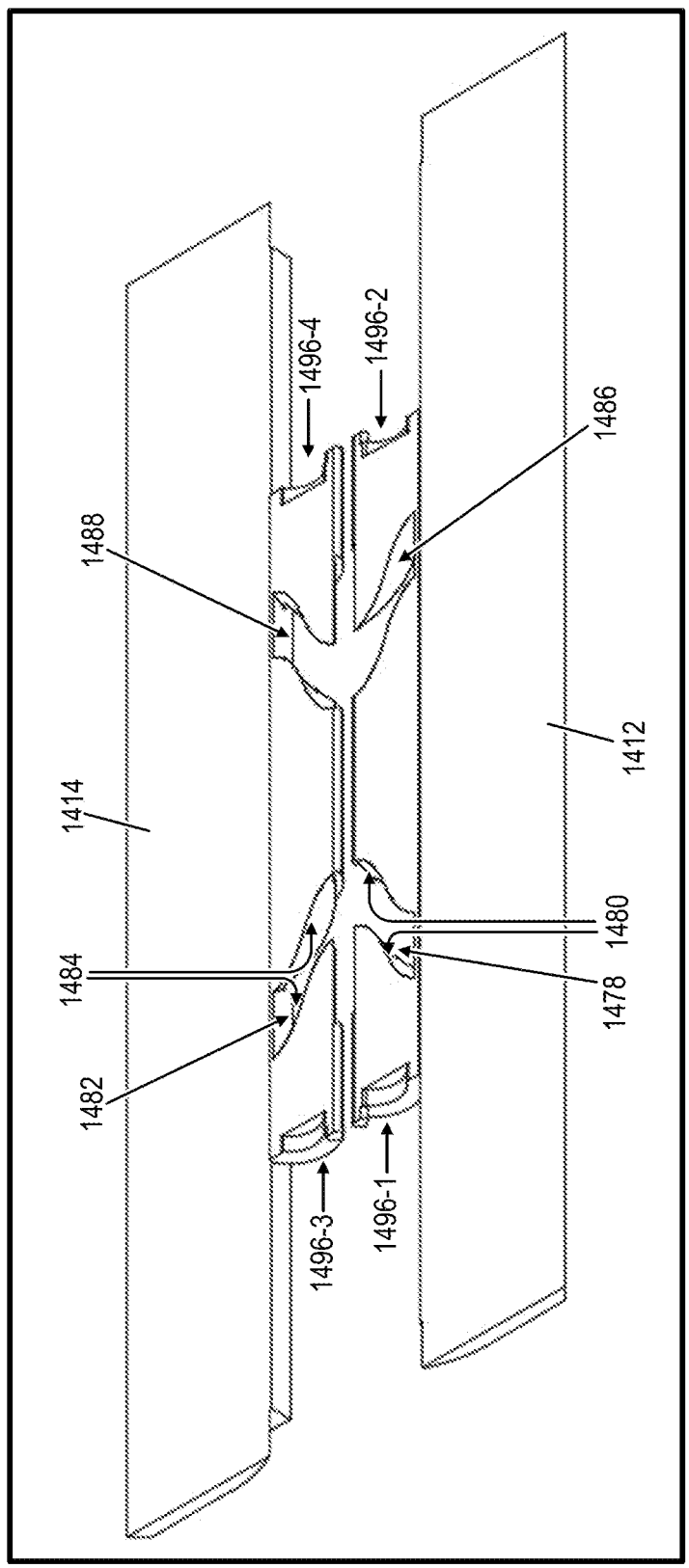
FIG. 19 shows a front side of a first linkage component and second a linkage component of the computing device of FIG. 14.

Referring also to FIG. 19, a front side first linkage component 1412 and second linkage component 1414 are shown without hinge core 1410 and without helical timing elements 1418 and 1420. First linkage component 1412 defines a first helical channel 1478 having one or more helical surfaces 1480 that interface with the first set of one or more helical surfaces 1470-1 of first helical timing element 1418. Second linkage component 1414 defines a second helical channel 1482 having one or more helical surfaces 1484 that interface with the second set of one or more helical surfaces 1470-2 of first helical timing element 1418.

First linkage component 1412 defines a third helical channel 1486 having one or more helical surfaces that interface with the first set of one or more helical surfaces 1474-1 of second helical timing element 1420. Second linkage component 1414 defines a fourth helical channel 1488 having one or more helical surfaces that interface with the second set of one or more helical surfaces 1474-2 of second helical timing element 1420.

Rotation of first portion 1402 and second portion 1404 relative to hinge core 1410 induces motion of first helical timing element 1418 relative to the hinge core and along first helical channel 1478 and second helical channel 1482. As an example, rotation of first portion 1402 and second portion 1404 from an open/unfolded configuration toward a closed/folded configuration induces motion (e.g., translation) of first helical timing element 1418 along guide portion 1422 of hinge core 1410 toward second helical timing element 1420. Conversely, rotation of first portion 1402 and second portion 1404 from the closed configuration toward the open configuration induces motion (e.g., translation) of first helical timing element 1418 along guide portion 1422 of hinge core 1410 away from second helical timing element 1420. As motion of the helical timing elements in this example is by translation along a rear side of the flexible display, the helical timing elements can maintain support of the flexible display across a range of configurations of the computing device.

Rotation of first portion 1402 and second portion 1404 relative to hinge core 1410 also induces motion of second helical timing element 1420 relative to the hinge core and along third helical channel 1486 and fourth helical channel 1488. As an example, rotation of first portion 1402 and second portion 1404 from the open/unfolded configuration toward the closed/folded configuration induces motion of second helical timing element 1420 along guide portion 1422 of hinge core 1410 toward first helical timing element 1418. Conversely, rotation of first portion 1402 and second portion 1404 from the closed/folded configuration toward the open/unfolded configuration induces motion of second helical timing element 1420 along guide portion 1422 of hinge core 1410 away from first helical timing element 1418.

Referring to FIGS. 18 and 19, first linkage component 1412 is rotatably coupled to hinge core 1410 via a first semicircular connector 1496-1 of the first linkage component that interfaces with a first semicircular slot 1498-1 of the hinge core, and via a second semicircular connector 1496-2 that interfaces with a second semicircular slot 1498-2 of the hinge core. First semicircular connector 1496-1 in combination with first semicircular slot 1498-1 forms a first virtual pivot mechanism, such as previously described with reference to FIG. 5. Similarly, second semicircular connector 1496-2 in combination with second semicircular slot 1498-2 forms a second virtual pivot mechanism. These virtual pivot mechanisms can be used to provide a virtual pivot and/or to increase an area over which forces are distributed at a rotatable coupling between first linkage component 1412 and hinge core 1410, which can increase strength and longevity of the rotatable coupling and the flexible display. It will be understood that other suitable configurations may be used to rotatably couple linkage components (e.g., first linkage component 1412) to the hinge core, including pinned connections, as an example.

Second linkage component 1414 may be rotatably coupled to hinge core 1410 via a third semicircular connector 1496-3 that interfaces with a third semicircular slot 1498-3 of the hinge core, and via a fourth semicircular connector 1496-4 that interfaces with a fourth semicircular slot 1498-4 of the hinge core. It will be understood that other suitable configurations may be used to rotatably couple linkage components to the hinge core, including pinned connections, as an example. Third semicircular connector 1496-3 in combination with third semicircular slot 1498-3 forms a third virtual pivot mechanism, such as previously described with reference to FIG. 5. Similarly, fourth semicircular connector 1496-4 in combination with fourth semicircular slot 1498-4 forms a second virtual pivot mechanism. These virtual pivot mechanisms can be used to provide a virtual pivot and/or to increase an area over which forces are distributed at a rotatable coupling between first linkage component 1412 and hinge core 1410, which can increase strength and longevity of the rotatable coupling and flexible display. Again, it will be understood that other suitable configurations may be used to rotatably couple linkage components (e.g., second linkage component 1414) to the hinge core, including pinned connections, as an example.

As previously described, a flexible display of a computing device may be folded to form a curved, "teardrop" shape through use of a backing support implemented using four-bar linkages, such as described with reference to computing device 1400. This "teardrop" shape has the potential to reduce damage, degradation, and wear of the flexible display over one or more folding or unfolding cycles. Additionally, as discussed above, other components of the computing device can be located on a rear side of the flexible display at regions where opposing sides of the flexible display narrow towards each other. For example, as shown in FIG. 20, other components of the computing device can be located on a rear side of flexible display 1406 in regions beyond hinge guides 1440 and 1446 from the curved region of the flexible display in the vicinity of hinge core 1410.

As shown in FIG. 20, first linkage component 1412 and second linkage component 1414 form portions of a backing support for flexible display 1406 in the closed/folded configuration. Within FIG. 20, a backing support surface of first linkage component 1412 for the flexible display is angled relative to a backing support surface of first portion 1402 for the flexible display in the closed/folded configuration as compared to the coplanar arrangement shown in FIGS. 16 and 17. Similarly, a backing support surface of second linkage component 1414 for the flexible display is angled relative to a backing support surface of second portion 1404 for the flexible display in the closed/folded configuration as compared to the coplanar arrangement shown in FIGS. 16 and 17.

Within computing device 1400, a first four-bar linkage is formed by first hinge guide 1440, first linkage component 1412, hinge core 1410, and first portion 1402. Additionally, within computing device 1400, a second four-bar linkage is formed by third hinge guide 1452, first linkage component 1412, hinge core 1410, and first portion 1402. Additionally within computing device 1400, a third four-bar linkage is formed by second hinge guide 1446, second linkage component 1414, hinge core 1410, and second portion 1404. Additionally within computing device 1400, a fourth four-bar linkage is formed by fourth hinge guide 1458, second linkage component 1414, hinge core 1410, and second portion 1404.

While various examples of four-bar linkages are disclosed herein, in at least some examples, computing device 1400 may omit hinge guides 1440, 1446, 1452, and 1458 and corresponding hinge guide slots. In these examples, three-bar linkages may be instead formed by hinge core 1410, a portion of the device (e.g., 1402, 1404), and a linkage component (e.g., 1412, 1414) that connects the portion of the device to the hinge core. These three-bar linkages may still enable flexible display 1406 to attain a curved, "teardrop" shape in the closed/folded configuration of FIG. 20. However, these three-bar linkages may offer reduced structural support as compared to multi-bar linkages having four or greater linkages. As an example, flexible sheets 1424-1 and 1424-2 or other rotational coupling may provide adequate support, in at least some implementations, to enable hinge guides 1440, 1446, 1452, and 1458 and corresponding hinge guide slots to be omitted from computing device 1400.

Within the previously described configuration of FIGS. 14-20, timing mechanism 1416 utilizes first linkage component 1412 and second linkage component 1414 to coordinate (e.g., synchronize) rotation of first portion 1402 relative to hinge core 1410 with rotation of second portion 1404 relative to the hinge core. FIG. 21 shows an example timing mechanism 2100 that utilizes a first hinge guide 2140 and a second hinge guide 2146 to coordinate (e.g., synchronize) rotation of a first portion relative to a hinge core 2110 and a second portion relative to the hinge core for a foldable computing device having a flexible display. By coordinating rotation of the first and second portions relative to each other, symmetrical configurations of the flexible display about the hinge assembly can be achieved in both the closed/folded configuration and the open/unfolded configuration. Additionally, such coordination by way of the timing mechanism can serve to maintain one of the first or second portions of the computing device at a fixed position relative to the hinge core by a user holding the other of the first or second portions at a fixed position relative to the hinge core.

Features of hinge core 2110 are represented schematically in FIG. 21 using broken lines to illustrate features of timing mechanism 2100. FIG. 21 shows a rotational positioning of first hinge guide 2140 and second hinge guide 2146 corresponding to a fully open/unfolded configuration of a foldable computing device in which the foldable display is flat or coplanar across first and second portions of the device. As previously described with reference to FIGS. 11 and 17, a hinge guide may comprise a protrusion that fits into a hinge guide slot defined by the first or second portion of the foldable computing device. In the example of FIG. 21, first hinge guide 2140 comprises a first elongate protrusion 2142 that fits into a first hinge guide slot (e.g., 1444 of FIG. 17) defined by a first portion of the foldable computing device, and second hinge guide 2146 comprises a second elongate protrusion 2148 that fits into a second hinge guide slot (e.g., 1450 of FIG. 17) defined by a second portion of the foldable computing device.

First hinge guide 2140 includes an axle 2190-1 or other suitable structure by which the first hinge guide is rotatably coupled to hinge core 1410. For example, hinge core 2110 may define a receptacle 2110-1 within which axle 2190-1 may rotate. Receptacle 2110-1 may define a cylindrically-shaped interior volume or a cradle, as examples. In at least some examples, receptacle 2110-1 and axle 2190-1 may form an integrated friction engine for first hinge guide 2140, such as previously described with reference to FIGS. 11 and 17.

While first hinge guide 2140 is rotatably coupled to hinge core 2110 via axle 2190-1 in this example, in another example, first hinge guide 2140 can be rotatably coupled to hinge core 2110 via a semicircular connector and corresponding semicircular slot, such as previously described with reference to FIG. 5. In this configuration, hinge guide 2140 can include a semicircular connector, and hinge core 1410 can include a respective semicircular slot that accommodates the semicircular connector.

Second hinge guide 2146 includes an axle 2190-2 or other suitable structure by which the second hinge guide is rotatably coupled to hinge core 1410. As previously described with reference to first hinge guide 2140, hinge core 2110 may define a receptacle 2110-2 within which axle 2190-2 may rotate. Receptacle 2110-2 may define a cylindrically-shaped interior volume or a cradle, as examples. In at least some examples, receptacle 2110-2 and axle 2190-2 may form an integrated friction engine for second hinge guide 2146, such as previously described with reference to FIGS. 11 and 17.

While second hinge guide 2146 is rotatably coupled to hinge core 2110 via axle 2190-2 in this example, in another example, second hinge guide 2146 can be rotatably coupled to hinge core 2110 via a semicircular connector and corresponding semicircular slot, such as previously described with reference to FIG. 5. In this configuration, hinge guide 2146 can include a semicircular connector, and hinge core 1410 can include a respective semicircular slot that accommodates the semicircular connector.

A portion 2196-1 of first hinge guide 2140 defines a first helical channel 2178 having a set of one or more helical surfaces 2180 (shown in FIG. 23) that interface with a set of one or more surfaces 2170-1 (described with reference to FIG. 24) of a first timing element 2118. In this configuration, first helical channel 2178 is defined by first hinge guide 2140 in contrast to the configuration of FIG. 19 in which first helical channel 1478 is defined by first linkage component 1412. As previously described, helical surfaces can be used to increase an area over which forces are distributed as compared to other timing mechanisms, thereby increasing the longevity and strength of the computing device. In this example, portion 2196-1 of first hinge guide 2140 forms an axle or a portion thereof that is accommodated by a corresponding receptacle 2110-3 defined by hinge core 2110 to further support rotation of the first hinge guide relative to the hinge core. Receptacle 2110-3 may define a cylindrically-shaped interior volume or a cradle, as examples.

A portion 2196-2 of second hinge guide 2146 defines a second helical channel 2182 having one or more helical surfaces 2184 (shown in FIG. 23) that interface with a second set of one or more surfaces 2170-2 of first helical timing element 2118. In this configuration, second helical channel 2182 is defined by second hinge guide 2146 in contrast to the configuration of FIG. 19 in which second helical channel 1482 is defined by second linkage component 1414. In this example, portion 2196-2 of second hinge guide 2140 forms an axle or a portion thereof that is accommodated by a corresponding receptacle 2110-4 defined by hinge core 2110 to further support rotation of the second hinge guide relative to the hinge core. Receptacle 2110-4 may define a cylindrically-shaped interior volume or a cradle, as examples.

Timing mechanism 2100 further includes a carrier shaft 2122 that passes through an opening formed in first timing element 2118, thereby constraining movement of the first timing element to translation along the carrier shaft in combination with portions 2196-1 and 2196-2. First timing element 2118 translates along carrier shaft 2122 and along a spine of the computing device responsive to rotation of first hinge guide 2140 and second hinge guide 2146 relative to hinge core 2110. In this configuration, carrier shaft 2122 in combination with first timing element 2118 may operate similar to a lead screw. As timing element 2118, in this example, translates along a rear side of a flexible display, support for the flexible display can be maintained by the first timing element across a range of configurations of the computing device.

Carrier shaft 2122, in this example, comprises threads 2124 that engage with corresponding threads formed within a receptacle 2110-5 defined by hinge core 2110, enabling carrier shaft 2122 to be mounted to the hinge core as part of an assembly process. In this configuration, receptacle 2110-5 forms a cylindrically-shaped interior volume having threads that engage with threads 2124 of carrier shaft 2122. Carrier shaft 2122 includes a stop element 2128 formed by an annular ring or other suitable structure that precludes translation of first timing element 2118 beyond the stop element due to rotation of first hinge guide 2140 and second hinge guide 2146 relative to the hinge core. Hinge core 2110 further defines a receptacle 2110-6 that accommodates and supports carrier shaft 2122 at an opposing end 2130 of the carrier shaft on an opposite side of first timing element 2118 from receptacle 2110-5. As an example, receptacle 2110-6 may take the form of a cradle.

In this example, first timing element 2118 further includes a planar surface 2172. Planar surface 2172 may form a portion of a backing surface for a flexible display, such as previously described with reference to planar surface 1428 of FIG. 18, thereby enabling the timing mechanism of the computing device to provide multiple functions that can serve to reduce a quantity of components of the computing device and/or the overall size of the computing device. In this configuration, planar surface 2172 of first timing element 2118 takes the form of a sliding display support surface that maintains contact with a rear face of the flexible display or with an intermediate layer that supports the flexible display throughout a range of movement of the foldable computing device from the fully open/unfolded configuration of FIG. 21 to a fully closed/folded configuration of FIG. 22.

Figure 22:
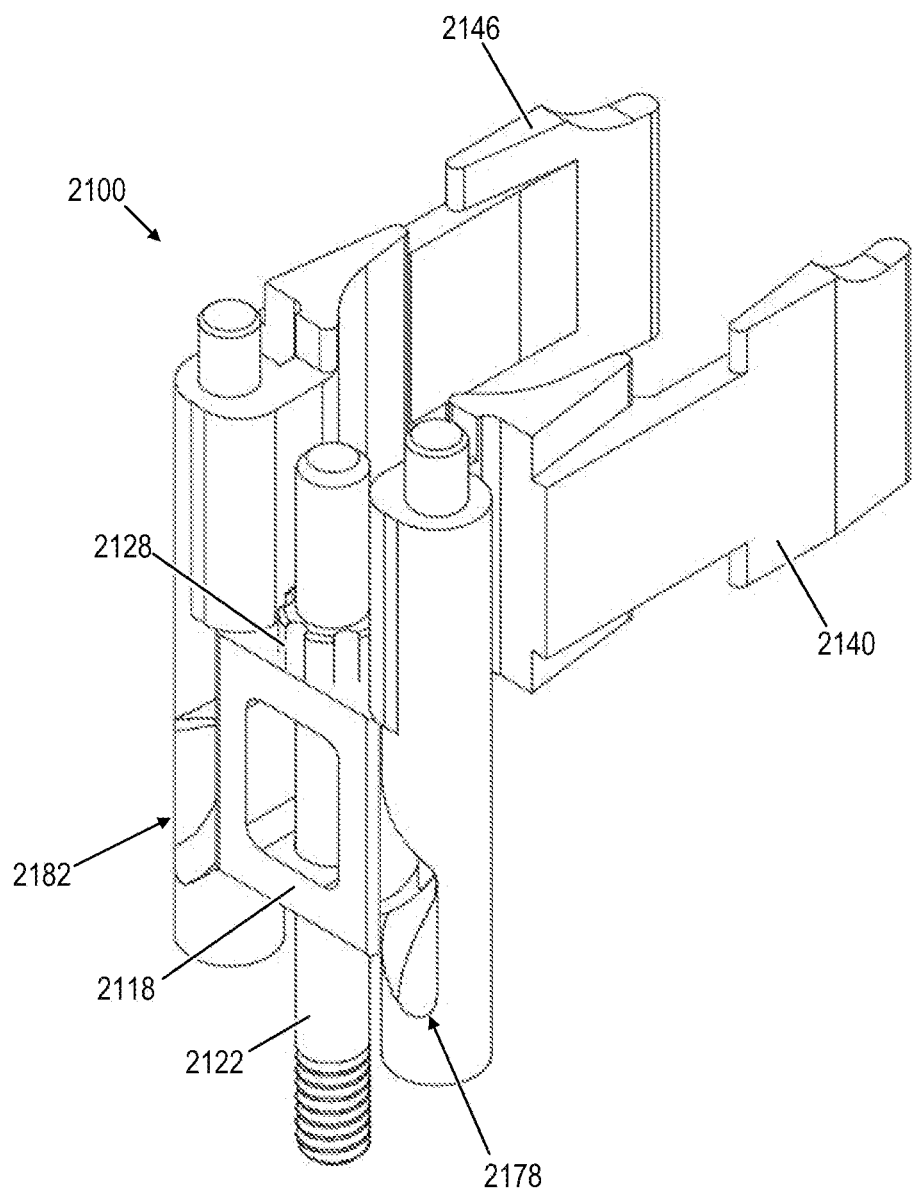
FIG. 22 shows the timing mechanism of FIG. 21 corresponding to a closed/folded configuration.

FIG. 22 shows a rotational positioning of first hinge guide 2140 and second hinge guide 2146 corresponding to the fully closed/folded configuration of the foldable computing device in which the foldable display may be folded in a "teardrop" shape, such as depicted in FIGS. 2 and 20, as examples. In the fully closed/folded configuration, first timing element 2118 is translated along carrier shaft 2122 towards and against stop element 2128 in contrast to the fully open/unfolded configuration of FIG. 21 in which first timing element 2118 is translated away and is offset from the stop element. The position of stop element 2128 along carrier shaft 2122 relative to an opening of receptacle 2110-5 may be used to define the rotational position of hinge guides 2140 and 1246 while at the fully closed/folded configuration. Threads 2124 may enable a depth of carrier shaft 2122 within receptacle 2110-5 to be adjusted as part of assembly or maintenance to define a desired rotational angle of hinge guides 2140 and 2146 corresponding to the fully closed/folded configuration. Additionally or alternatively, stop element 2128 may be threaded onto carrier shaft 2122, enabling the position of the stop element 2128 along the carrier shaft to be adjusted to define a desired rotational angle of hinge guides 2140 and 2146 corresponding to the fully closed/folded configuration.

Figure 23:
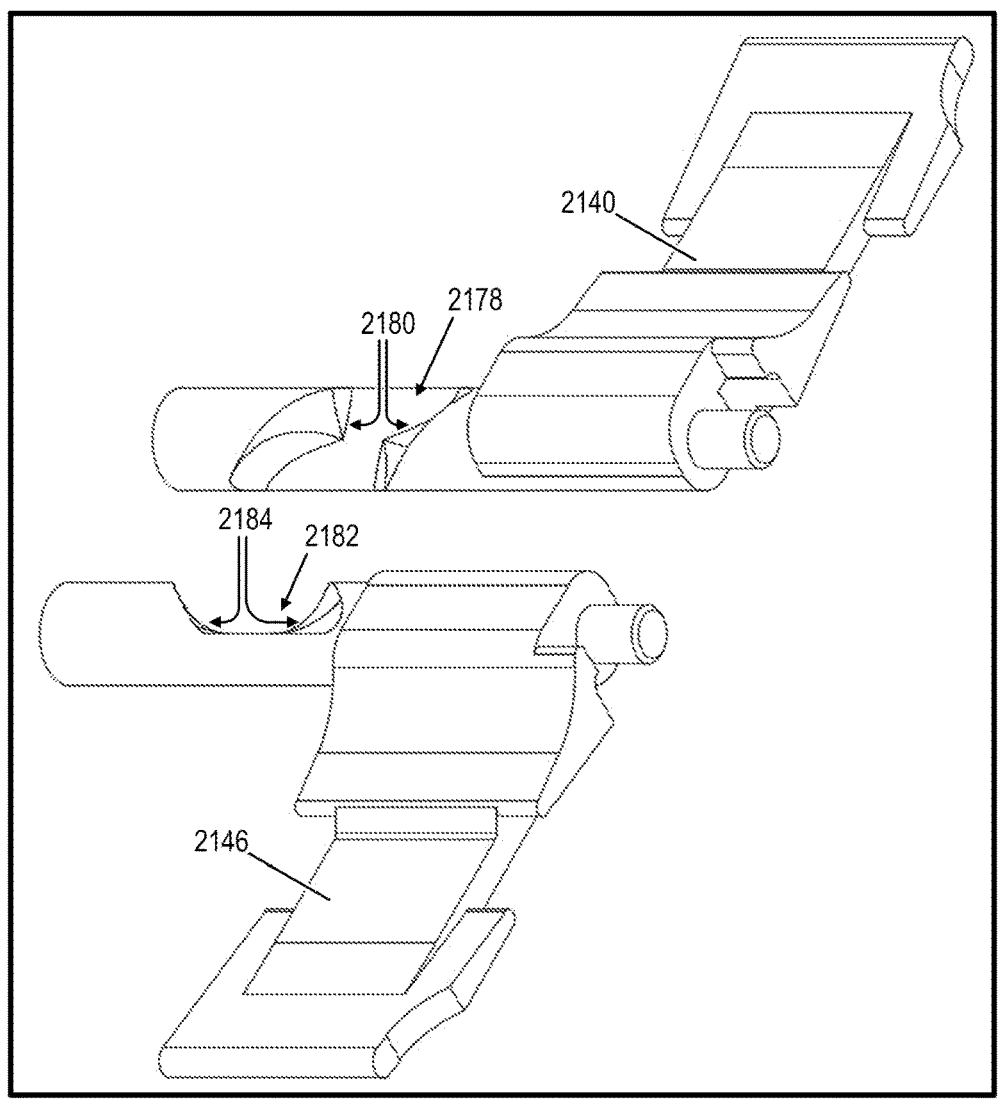
FIG. 23 shows first and second hinge guides of the timing mechanism of FIGS. 21 and 23.

FIG. 23 shows first hinge guide 2140 and second hinge guide 2146 with first timing element 2118 and carrier shaft 2122 omitted to reveal the set of one or more helical surfaces 2180 of first helical channel 2178, and the set of one or more helical surfaces 2184 of second helical channel 2182.

Figure 24:
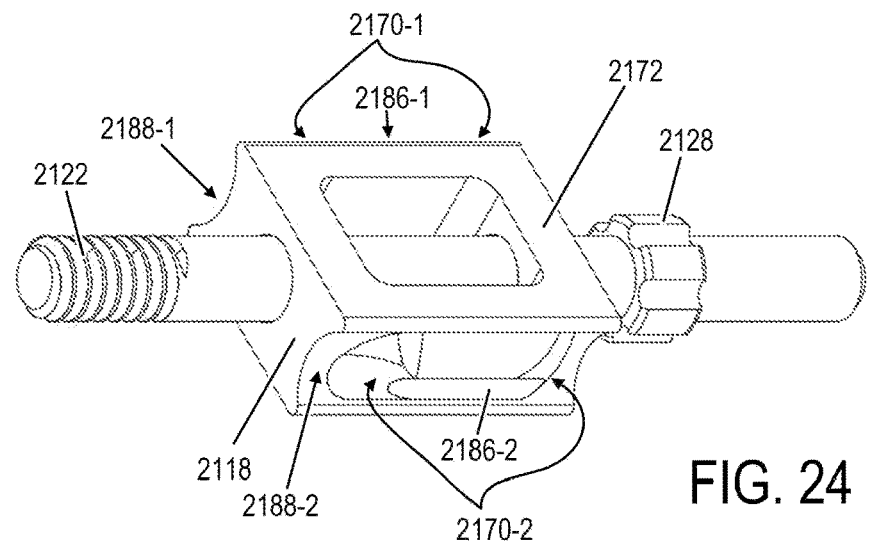
FIG. 24 shows a timing element of the timing mechanism of FIGS. 21 and 23.

FIG. 24 shows first timing element 2118 and carrier shaft 2122 with first hinge guide 2140 and second hinge guide 2146 omitted to reveal surfaces a first protrusion 2186-2 formed by surface 2170-2 that interface with helical surfaces 2184 of second helical channel 2182. In this example, protrusion 2186-2 projects outward from an interior-curved surface 2188-2 that accommodates an exterior-curved surface of portion 2196-2. In this configuration, protrusion 2186-2 takes the form of a follower with respect to helical surfaces 2184 of second helical channel 2182.

The set of one or more surfaces 2170-1 that interface with surfaces 2180 of first helical channel 2178 may have a similar configuration as surfaces 2170-2, but mirrored across a plane that bisects carrier shaft 2122. For example, surfaces 2170-1 form a protrusion 2186-1 that projects outward from an interior-curved surface 2188-1 that accommodates an exterior-curved surface of portion 2196-1. In this configuration, protrusion 2186-1 takes the form of a follower with respect to helical surfaces 2180 of second helical channel 2178.

Timing mechanism 2100 described with reference to FIGS. 21-24 may be one of two or more instances of a timing mechanism of a computing device having a flexible display. As an example, a first instance and a second instance of timing mechanism 2100 may be orientated in opposing directions relative to each other, such as depicted in FIG. 15 with respect to hinge guides 1440 and 1446, and hinge guides 1452 and 1458.

FIGS. 25-33 show another example computing device 2500 that includes a first portion 2502, a second portion 2504, a hinge assembly 2506 that rotatably couples the first portion and second portion, and a flexible display 2508. Flexible display 2508 extends at least partially across first portion 2502 and second portion 2504, and spans hinge assembly 2506.

Figure 25:
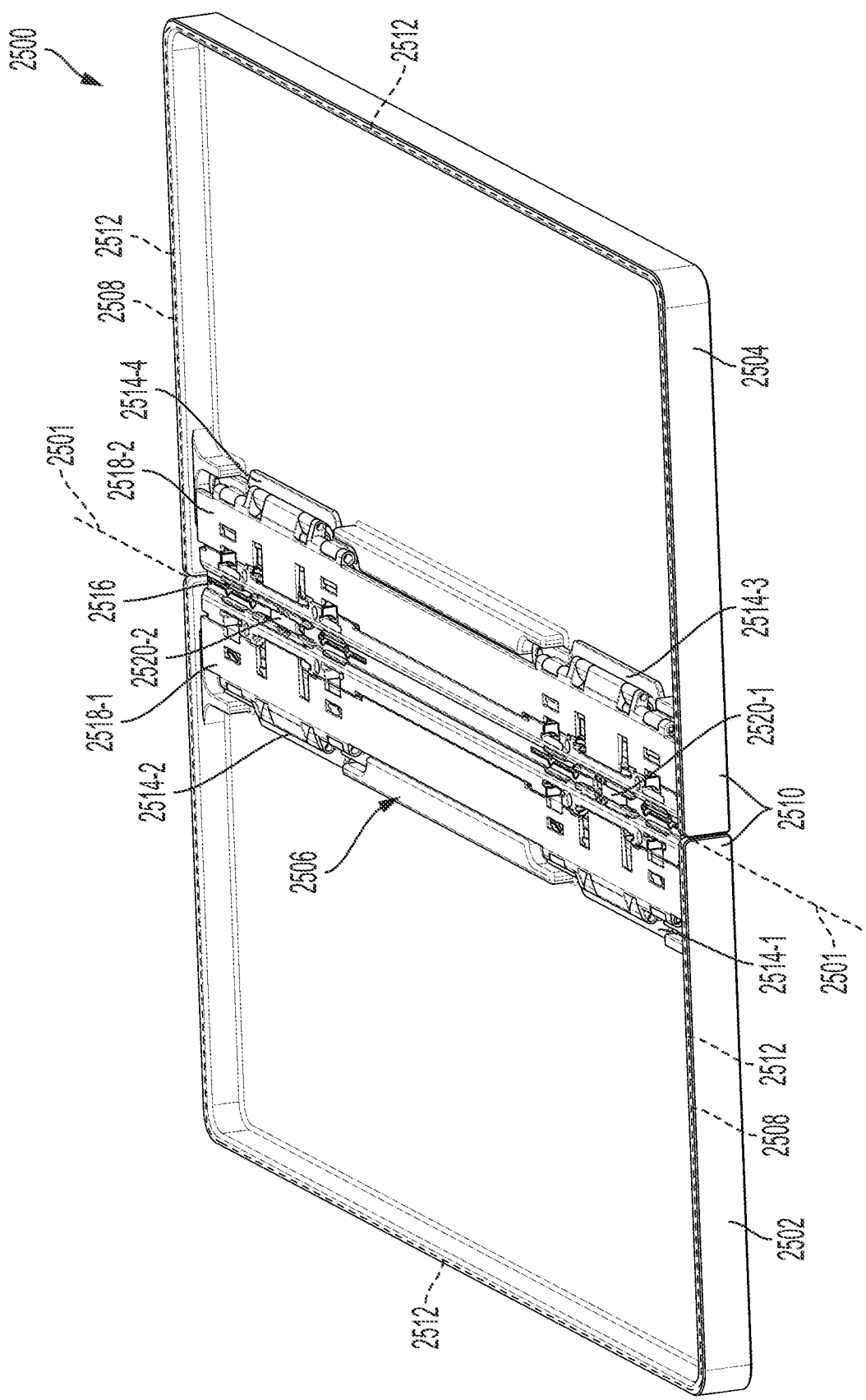
FIG. 25 shows a front side of another example computing device having a flexible display in an open/unfolded configuration.

Hinge assembly 2506 enables computing device 2500 including flexible display 2508 to be folded and unfolded along a spine 2501 (depicted schematically in FIG. 25) of the computing device between an open/flat configuration (e.g., as shown in FIG. 25) and a closed/folded configuration (e.g., as shown in FIG. 33).

FIG. 25 shows a front side (i.e., a display side) of computing device 2500 in which flexible display 2508 is represented using wireframe having a broken line of a first type to reveal other components of computing device 2500, including hinge assembly 2506. First portion 2502, in this example, forms a first portion of a device body 2510 (or chassis) of computing device 2500, and second portion 2504 forms a second portion of the device body 2510 (or chassis) of the computing device. Flexible display 2508, in this example, extends up to an outer edge or perimeter 2512 of device body 2510 formed by first portion 2502 and second portion 2504. In the open/unfolded configuration of FIG. 25, flexible display 2508 has a flat or planar configuration, and provides a continuous display surface within a region defined by the outer edge or perimeter 2512.

In this example, hinge assembly 2506 is mounted to first portion 2502 via a first bracket 2514-1 and a second bracket 2514-2, and hinge assembly 2506 is mounted to second portion 2504 via a third bracket 2514-3 and a fourth bracket 2514-4. Features of hinge assembly 2506 visible within FIG. 25 include a hinge core 2516, a first display backing linkage 2518-1, and a second display backing linkage 2518-2. Linkages 2518-1 and 2518-2, and hinge core 2516 collectively form at least a portion of a backing support for flexible display 2508 across hinge assembly 2506.

Hinge assembly 2506 further includes a first timing element 2520-1 and a second timing element 2520-2, as examples of timing mechanisms, that coordinate rotation of first portion 2502 relative to hinge core 2516 with rotation of second portion 2504 relative to the hinge core. As previously described, by coordinating rotation of the first and second portions of the computing device relative to each other, symmetrical configurations of the flexible display about the hinge assembly can be achieved in both the closed/folded configuration and the open/unfolded configuration. Additionally, such coordination by way of the timing mechanism can serve to maintain one of the first or second portions of the computing device at a fixed position relative to the hinge core by a user holding the other of the first or second portions at a fixed position relative to the hinge core. While computing device 2500 is described as utilizing first timing element 2520-1 and second timing element 2520-2 as examples of a timing mechanism, these timing elements can be omitted in other examples and/or can be replaced with a different timing mechanism.

In contrast to computing device 1400 of FIGS. 14-20 that includes a sliding joint for at least some linkages (e.g., 1440 and 1446), hinge assembly 2506 includes multi-bar linkages that feature rotational joints between each of the linkages, as described in further detail with reference to FIGS. 26-33. In this example, the multi-bar linkages of hinge assembly 2506 each include six linkages.

Figure 26:
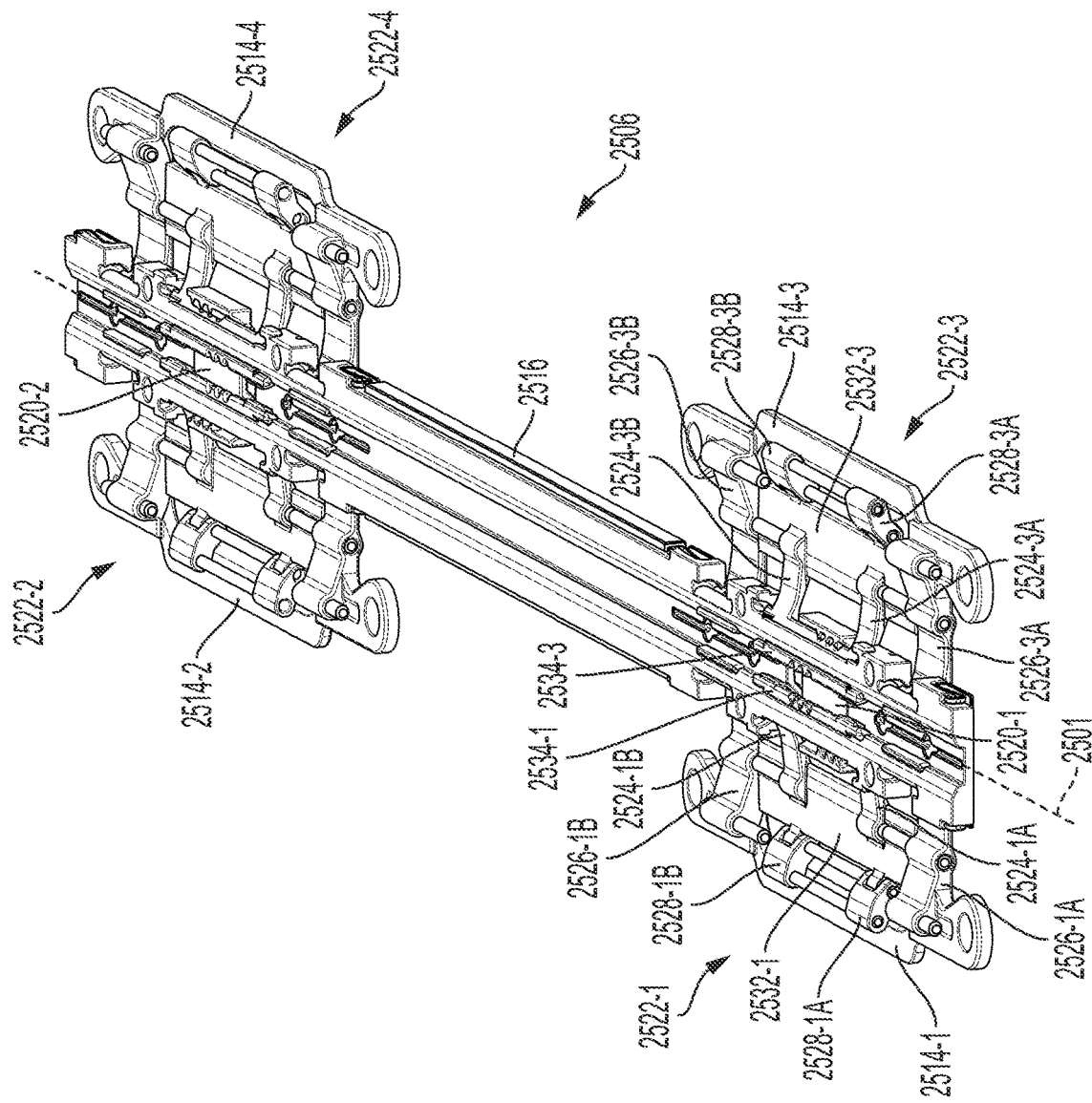
FIG. 26 shows the front side of the hinge assembly of the computing device of FIG. 25.

FIG. 26 shows additional features of hinge assembly 2506 in the open/unfolded configuration of FIG. 25 with first display backing linkage 2518-1 and second display backing linkage 2518-2 removed. Hinge assembly 2506 includes a first linkage assembly 2522-1 and a second linkage assembly 2522-2 located on a first side of spine 2501, and a third linkage assembly 2522-3 and a fourth linkage assembly 2522-4 located on a second side of spine 2501. In this example, first linkage assembly 2522-1 rotatably couples first portion 2502 via first bracket 2514-1 to hinge core 2516, second linkage assembly 2522-2 rotatably couples first portion 2502 via second bracket 2514-2 to hinge core 2516, third linkage assembly 2522-3 rotatably couples second portion 2504 via third bracket 2514-3 to hinge core 2516, and fourth linkage assembly 2522-4 rotatably couples second portion 2504 via fourth bracket 2514-4 to hinge core 2516.

In this example, first bracket 2514-1 includes a second rocker linkage 2526-1A and a second rocker linkage 2526-1B that function in parallel with each other. First linkage assembly 2522-1 includes a first multi-bar linkage having six linkages formed by hinge core 2516, a first rocker linkage 2524-1A, second rocker linkage 2526-1A of first bracket 2514-1, a coupler linkage 2528-1A, an intermediate linkage 2530-1A (shown in FIG. 27), and first display backing linkage 2518-1 (shown in FIGS. 25 and 28). First linkage assembly 2522-1 further includes a second multi-bar linkage that operates in parallel with the first multi-bar linkage of first linkage assembly 2522-1, which can improve stability, strength, and resiliency of first linkage assembly 2522-1. The second multi-bar linkage of first linkage assembly 2522-1 is formed by hinge core 2516, a first rocker linkage 2524-1B, second rocker linkage 2526-1B of first bracket 2514-1, a coupler linkage 2528-1B, an intermediate linkage 2530-1B (shown in FIG. 27), and first display backing linkage 2518-1 (shown in FIGS. 25 and 28).

First rocker linkage 2524-1A is joined with first rocker linkage 2524-1B via a spanning member 2532-1. First rocker linkage 2524-1A is also joined with first rocker linkage 2524-1B via a spanning member 2534-1. In this example, spanning member 2534-1 takes the form of a semicircular connector that forms part of a joint 2566-1 (e.g., a virtual pivot) as described in further detail with reference to FIGS. 27-32. First bracket 2514-1, as an example of a spanning member, joins second rocker linkage 2526-1A with second rocker linkage 2526-1B as components of the first bracket.

Third linkage assembly 2522-3 can have a similar configuration as first linkage assembly 2522-1 that is mirrored across spine 2501 in an opposite direction from first linkage assembly 2522-1. For example, third bracket 2514-3 includes a second rocker linkage 2526-3A and a second rocker linkage 2526-3B that function in parallel with each other. Third linkage assembly 2522-3 includes a first multi-bar linkage having six linkages formed by hinge core 2516, a first rocker linkage 2524-3A, second rocker linkage 2526-3A of third bracket 2514-3, a coupler linkage 2528-3A, an intermediate linkage 2530-3A (shown in FIG. 27), and second display backing linkage 2518-2 (shown in FIGS. 25 and 28). Third linkage assembly 2522-3 further includes a second multi-bar linkage that operates in parallel with the first multi-bar linkage of third linkage assembly 2522-3, which can improve stability, strength, and resiliency of third linkage assembly 2522-3. The second multi-bar linkage of third linkage assembly 2522-3 is formed by hinge core 2516, a first rocker linkage 2524-3B, second rocker linkage 2526-3B of third bracket 2514-3, a coupler linkage 2528-3B, an intermediate linkage 2530-3B (shown in FIG. 27), and second display backing linkage 2518-2 (shown in FIGS. 25 and 28).

First rocker linkage 2524-3A is joined with first rocker linkage 2524-3B via a spanning member 2532-3. First rocker linkage 2524-3A is also joined with first rocker linkage 2524-3B via a spanning member 2534-3. In this example, spanning member 2534-3 takes the form of a semicircular connector that forms part of a joint 2566-3 (e.g., a virtual pivot) as described in further detail with reference to FIGS. 27-32. Third bracket 2514-3, as an example of a spanning member, joins second rocker linkage 2526-3A with second rocker linkage 2526-3B as components of the third bracket.

Second linkage assembly 2522-2 can have a similar configuration as first linkage assembly 2522-1 that is located at a different position along spine 2501. In at least some examples, second linkage assembly 2522-2 may have a form similar to first linkage assembly 2522-1 that is mirrored about a plane that is orthogonal to and bisects spine 2501. By providing two linkage assemblies 2522-1 and 2522-2 along spine 2501 to rotatably couple first portion 2502 to hinge core 2516, stability, strength, and resiliency of hinge assembly 2506 may be improved with respect to rotation of first portion 2502.

Fourth linkage assembly 2522-4 can have a similar configuration as third linkage assembly 2522-3 that is located at a different position along spine 2501. In at least some examples, fourth linkage assembly 2522-4 may have a form similar to third linkage assembly 2522-3 that is mirrored about a plane that is orthogonal to and bisects spine 2501. By providing two linkage assemblies 2522-3 and 2522-4 along spine 2501 to rotatably couple second portion 2504 to hinge core 2516, stability, strength, and resiliency of hinge assembly 2506 may be improved with respect to rotation of second portion 2504.

Figure 27:
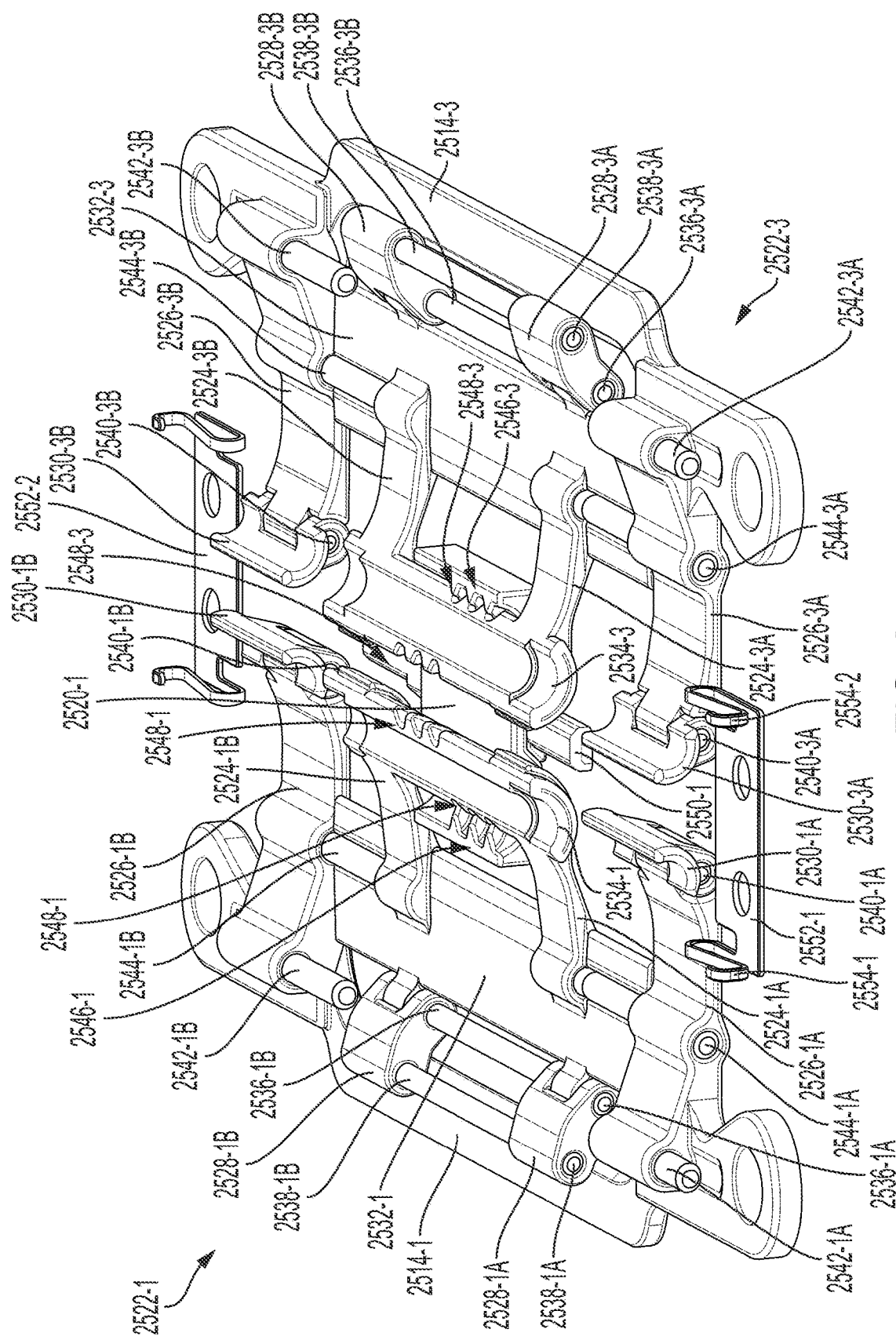
FIG. 27 shows the front side of two linkage assemblies of the hinge assembly of FIG. 25 with components removed to reveal additional features.

FIG. 27 shows additional features of first linkage assembly 2522-1 and third linkage assembly 2522-3 with hinge core 2516 removed. Within first linkage assembly 2522-1, first rocker linkage 2524-1A and first rocker linkage 2524-1B are rotatably coupled to coupler linkage 2528-1A via joint 2536-1A and coupler linkage 2528-1B via joint 2536-1B. Joints 2536-1A and 2536-1B are co-axial with each other in this example, and are formed by a common shaft or pin that spans both joints. However, in other examples, separate pins or shafts may be used for joints 2536-1A and 2536-1B.

Figure 28:
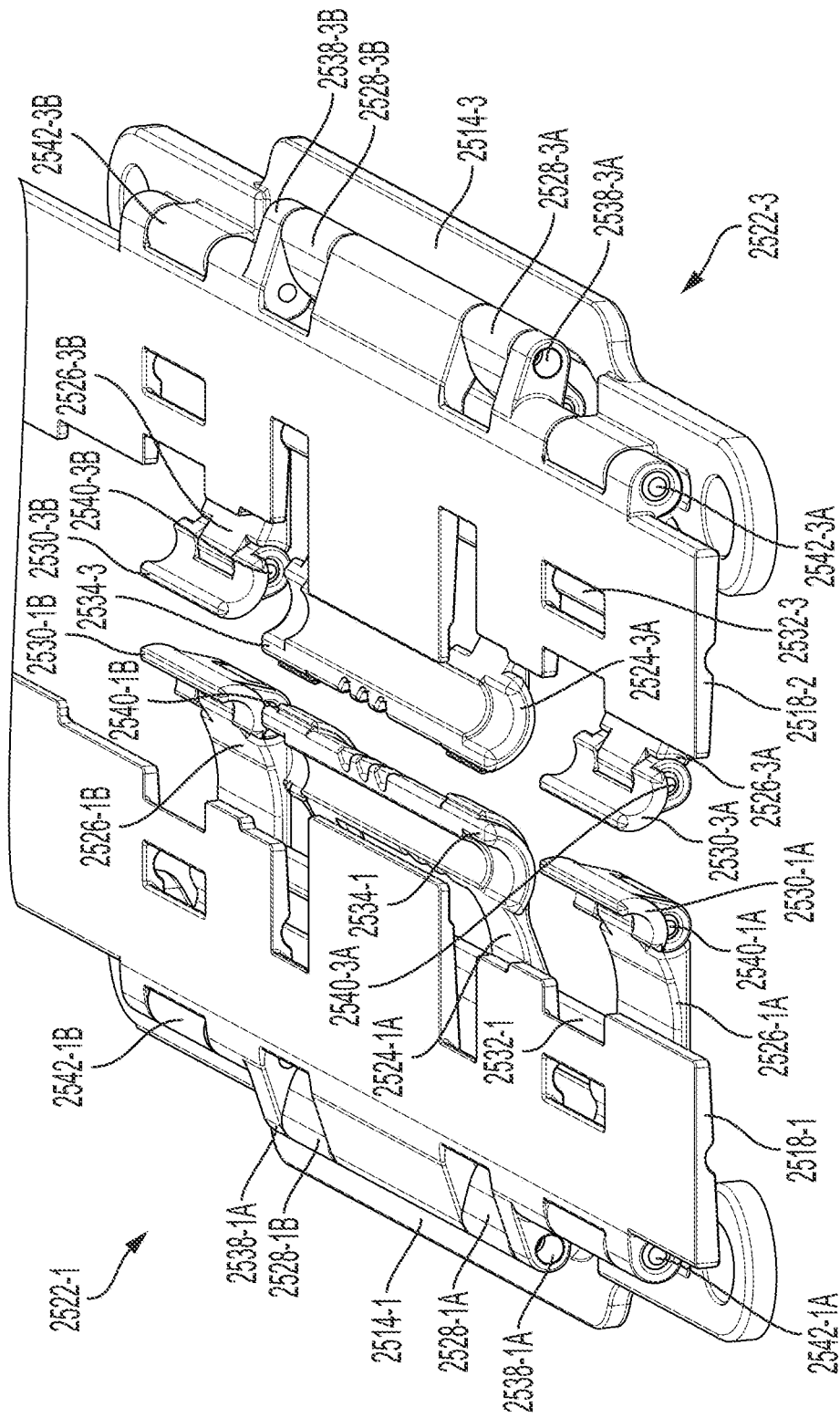
FIG. 28 shows the front side of the two linkage assemblies of the hinge assembly of FIG. 25 with components removed to reveal additional features.

Referring also to FIG. 28, coupler linkage 2528-1A is rotatably coupled to first display backing linkage 2518-1 via joint 2538-1A, and coupler linkage 2528-1B is rotatably coupled to first display backing linkage 2518-1 via joint 2538-1B. Joints 2538-1A and 2538-1B are co-axial with each other in this example, and are formed by a common shaft or pin that spans both joints. However, in other examples, separate pins or shafts may be used for joints 2538-1A and 2538-1B.

Referring to both FIGS. 27 and 28, a first end of second rocker linkage 2526-1A of first bracket 2514-1 is rotatably coupled to intermediate linkage 2530-1A via joint 2540-1A, and an opposing second end of second rocker linkage 2526-1A of first bracket 2514-1 is rotatably coupled to first display backing linkage 2518-1 via joint 2542-1A. Similarly, a first end of second rocker linkage 2526-1B of first bracket 2514-1 is rotatably coupled to intermediate linkage 2530-1B via joint 2540-1B, and an opposing second end of second rocker linkage 2526-1B of first bracket 2514-1 is rotatably coupled to first display backing linkage 2518-1 via joint 2542-1B. In this example, joints 2540-1A and 2540-1B are co-axial with each other, and joints 2542-1A and 2542-1B are co-axial with each other.

Intermediate linkages 2530-1A and 2530-1B, in this example, each take the form of a semicircular connector that forms part of a respective joint 2568-1A, 2568-1B (e.g., a virtual pivot) as described in further detail with reference to FIGS. 29-32.

As shown in FIG. 27, first rocker linkage 2524-1A is rotatably coupled to second rocker linkage 2526-1A of first bracket 2514-1 via joint 2544-1A along an intermediate region of first rocker linkage 2524-1A between spanning member 2534-1 and joint 2536-1A, and along an intermediate region of second rocker linkage 2526-1A between joint 2540-1A and joint 2542-1A. Similarly, first rocker linkage 2524-1B of first bracket 2514-1 is rotatably coupled to second rocker linkage 2526-1B of first bracket 2514-1 via joint 2544-1B along an intermediate region of first rocker linkage 2524-1B between spanning member 2534-1 and joint 2536-1B, and along an intermediate region of second rocker linkage 2526-1B between joint 2540-1B and joint 2542-1B. Joints 2544-1A and 2544-1B are co-axial in this example.

As previously described, first linkage assembly 2522-1 includes a first multi-bar linkage having six linkages formed by hinge core 2516, a first rocker linkage 2524-1A, a second rocker linkage 2526-1A of first bracket 2514-1, a coupler linkage 2528-1A, an intermediate linkage 2530-1A, and first display backing linkage 2518-1. First rocker linkage 2524-1A and second rocker linkage 2526-1A of first bracket 2514-1 couple motion of two four-bar linkages via joint 2544-1A. In this example, a first four-bar linkage is formed by hinge core 2516, a portion of first rocker linkage 2524-1A between joint 2544-1A and the hinge core, a portion of second rocker linkage 2526-1A of first bracket 2514-1 between joint 2544-1A and joint 2540-1A, and intermediate linkage 2530-1A. A second four-bar linkage is formed by a portion of first rocker linkage 2524-1A between joint 2544-

1A and joint 2536-1A, coupler linkage 2528-1A, a portion of first display backing linkage 2518-1 between joint 2538-1A and joint 2542-1A, and a portion of second rocker linkage 2526-1A of first bracket 2514-1 between joint 2542-1A and joint 2544-1A. These two four-bar linkages offer the potential to structurally support a flexible display across a range of motion between an open/unfolded configuration and a closed/folded configuration, while also supporting a suitable curvature and overall shape of the flexible display in the closed/folded configuration.

As previously described, third linkage assembly 2522-3 can have a similar configuration as first linkage assembly 2522-1 that is mirrored across spine 2501 in an opposite direction from first linkage assembly 2522-1. Referring to FIGS. 27 and 28, within third linkage assembly 2522-3, first rocker linkage 2524-3A and first rocker linkage 2524-3B are rotatably coupled to coupler linkage 2528-3A via joint 2536-3A and coupler linkage 2528-3B via joint 2536-3B. Joints 2536-3A and 2536-3B are co-axial with each other in this example, and are formed by a common shaft or pin that spans both joints. However, in other examples, separate pins or shafts may be used for joints 2536-3A and 2536-3B.

Within FIG. 28, coupler linkage 2528-3A is rotatably coupled to second display backing linkage 2518-2 via joint 2538-3A, and coupler linkage 2528-3B is rotatably coupled to second display backing linkage 2518-2 via joint 2538-3B. Joints 2538-3A and 2538-3B are co-axial with each other in this example, and are formed by a common shaft or pin that spans both joints. However, in other examples, separate pins or shafts may be used for joints 2538-3A and 2538-3B.

A first end of second rocker linkage 2526-3A of third bracket 2514-3 is rotatably coupled to intermediate linkage 2530-3A via joint 2540-3A, and an opposing second end of second rocker linkage 2526-3A of third bracket 2514-3 is rotatably coupled to second display backing linkage 2518-2 via joint 2542-3A. Similarly, a first end of second rocker linkage 2526-3B of third bracket 2514-3 is rotatably coupled to intermediate linkage 2530-3B via joint 2540-3B, and an opposing second end of second rocker linkage 2526-3B of third bracket 2514-3 is rotatably coupled to second display backing linkage 2518-2 via joint 2542-3B. In this example, joints 2540-3A and 2540-3B are co-axial with each other, and joints 2542-3A and 2542-3B are co-axial with each other.

Intermediate linkages 2530-3A and 2530-3B, in this example, each take the form of a semicircular connector that forms part of a respective joint 2568-3A, 2568-3B (e.g., a virtual pivot) as described in further detail with reference to FIGS. 29-32.

First rocker linkage 2524-3A is rotatably coupled to second rocker linkage 2526-3A of third bracket 2514-3 via joint 2544-3A along an intermediate region of first rocker linkage 2524-3A between spanning member 2534-3 and joint 2536-3A, and along an intermediate region of second rocker linkage 2526-3A between joint 2540-3A and joint 2542-3A. Similarly, first rocker linkage 2524-3B is rotatably coupled to second rocker linkage 2526-3B of third bracket 2514-3 via joint 2544-3B along an intermediate region of first rocker linkage 2524-3B between spanning member 2534-3 and joint 2536-3B, and along an intermediate region of second rocker linkage 2526-3B between joint 2540-3B and joint 2542-3B. Joints 2544-3A and 2544-3B are co-axial in this example.

As previously described, third linkage assembly 2522-1 includes a first multi-bar linkage having six linkages formed by hinge core 2516, a first rocker linkage 2524-3A, a second rocker linkage 2526-3A of third bracket 2514-3, a coupler linkage 2528-3A, an intermediate linkage 2530-3A, and second display backing linkage 2518-2. First rocker linkage 2524-3A and second rocker linkage 2526-3A of third bracket 2514-3 couple motion of two four-bar linkages via joint 2544-3A. In this example, a first four-bar linkage is formed by hinge core 2516, a portion of first rocker linkage 2524-3A between joint 2544-3A and the hinge core, a portion of second rocker linkage 2526-3A of third bracket 2514-3 between joint 2544-3A and joint 2540-3A, and intermediate linkage 2530-3A. A second four-bar linkage is formed by a portion of first rocker linkage 2524-3A between joint 2544-3A and joint 2536-3A, coupler linkage 2528-3A, a portion of first display backing linkage 2518-2 between joint 2538-3A and joint 2542-3A, and a portion of second rocker linkage 2526-3A of third bracket 2514-3 between joint 2542-3A and joint 2544-3A. These two four-bar linkages offer the potential to structurally support a flexible display across a range of motion between an open/unfolded configuration and a closed/folded configuration, while also supporting a suitable curvature and overall shape of the flexible display in the closed/folded configuration.

Referring to FIG. 27, first timing element 2520-1 coordinates rotation of first portion 2502 relative to hinge core 2516 with rotation of second portion 2504 relative to the hinge core. In this example, first timing element 2520-1 takes the form of a helical timing element that defines a first set of helical surfaces 2546-1 that interface with a corresponding set of helical surfaces 2548-1 defined by spanning member 2534-1 of first linkage assembly 2522-1. In this example, the first set of helical surfaces 2546-1 and the corresponding set of helical surfaces 2548-1 each form helical threads that interface with and accommodate each other such that rotation of spanning member 2534-1 relative to first timing element 2520-1 results in translation of first timing element 2520-1 along a first guide portion 2550-1 of hinge core 2516 that is parallel to spine 2501. In this example, rotation of spanning member 2534-1 drives first guide portion 2550-1 due to rotation of second portion 2502 relative to hinge core 2516. Conversely, translation of first timing element 2520-1 along first guide portion 2550-1 (e.g., due to rotation of spanning member 2534-3 of third linkage assembly 2522-3) results in rotation of spanning member 2534-1 relative to first timing element 2520-1. In this example, first guide portion 2550-1 drives spanning member 2534-1, which in turn drives rotation of first portion 2502 via first linkage assembly 2522-1.

First timing element 2520-1, as a helical timing element, further defines a second set of helical surfaces 2546-3 that interface with another corresponding set of helical surfaces 2548-3 defined by spanning member 2534-3 of third linkage assembly 2522-3. In this example, the second set of helical surfaces 2546-3 and the corresponding set of helical surfaces 2548-3 each form helical threads that interface with and accommodate each other such that rotation of spanning member 2534-3 relative to first timing element 2520-1 results in translation of first timing element 2520-1 along first guide portion 2550-1. In this example, rotation of spanning member 2534-3 due to rotation of second portion 2504 relative to hinge core 2516 drives first guide portion 2550-1. Conversely, translation of first timing element 2520-1 along first guide portion 2550-1 (e.g., due to rotation of spanning member 2534-1 of first linkage assembly 2522-1) results in rotation of spanning member 2534-3 relative to first timing element 2520-1. In this example, first guide portion 2550-1 drives spanning member 2534-3, which in turn drives rotation of second portion 2504 via third linkage assembly 2522-3.

Second timing element 2520-2 may have a similar form as first timing element 2520-1, but can be orientated in an opposite direction from first timing element 2520-1 along spine 2501. Second timing element 2520-2 includes helical surfaces that similarly interface with second linkage assembly 2522-2 and fourth linkage assembly 2522-4 to coordinate rotation of first portion 2502 relative to hinge core 2516 with rotation of second portion 2504 relative to the hinge core.

Figure 30:
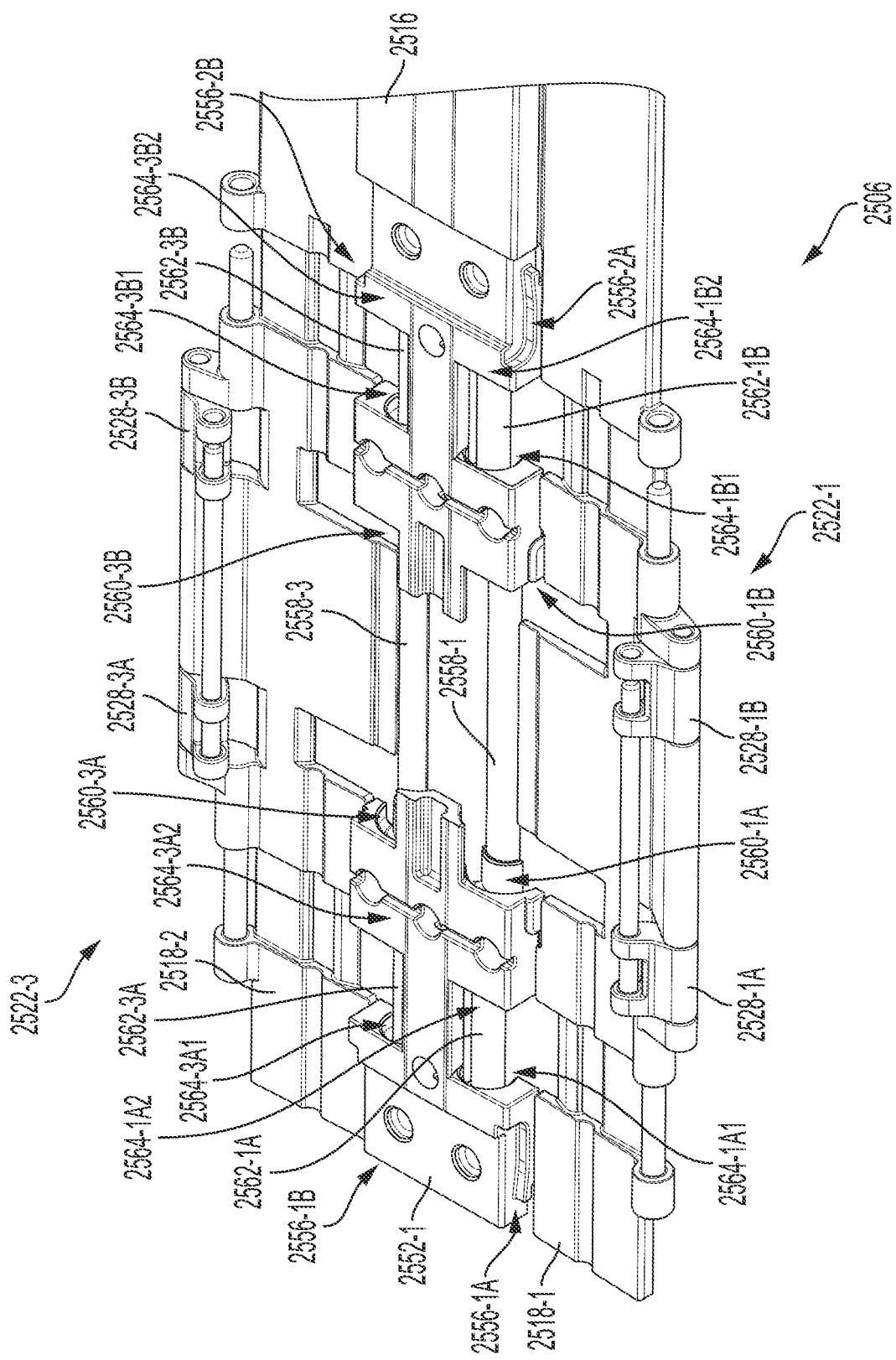
FIG. 30 shows a rear side of a portion of the hinge assembly of FIG. 25 with components removed to reveal additional features.

As shown in FIG. 27 in which hinge core 2516 is removed, hinge assembly 2506 further includes a pair of rear mounting brackets 2552-1 and 2552-2 located on opposing sides of first linkage assembly 2522-1 and third linkage assembly 2522-3 along spine 2501. Each of mounting brackets 2552-1 and 2552-2 include a pair of clips 2554-1 and 2554-2 that engage with corresponding receptacles on a rear side of hinge core 2516, as shown in FIG. 30. A spine cover can be mounted to rear mounting brackets 2552-1 and 2552-2. The spine cover can form part of the device body of computing device 2500 that is exposed when first portion 2502 and second portion 2504 are rotated to the closed/folded configuration. Hinge assembly 2506 further includes another pair of rear mounting brackets located on opposing sides of second linkage assembly 2522-2 and fourth linkage assembly 2522-4 in a configuration similar to rear mounting brackets 2552-1 and 2552-2.

Figure 29:
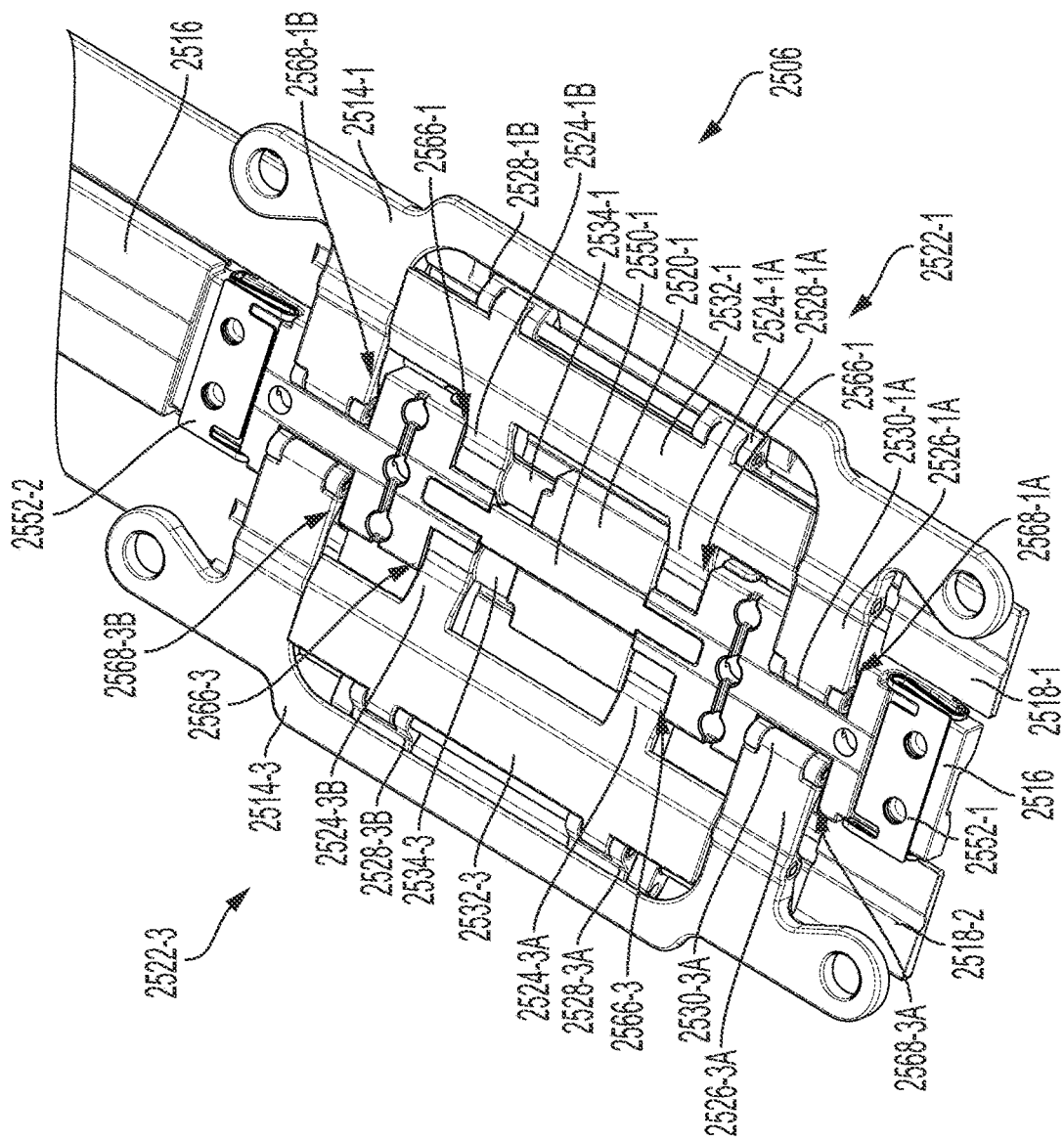
FIG. 29 shows a rear side of a portion of the hinge assembly of FIG. 25.

FIG. 29 shows a portion of a rear side of hinge assembly 2506, including first linkage assembly 2522-1 and third linkage assembly 2522-3. FIG. 30 shows the portion of the rear side of hinge assembly 2506 shown in FIG. 29 with components removed to reveal features of hinge core 2516.

As shown in FIGS. 29 and 30, joint 2566-1 for first linkage assembly 2522-1 is formed by the semicircular connector of spanning member 2534-1, and a cylindrical axle 2558-1 of hinge core 2516 and semicircular slots 2560-1A and 2560-1B of hinge core 2516 that accommodate the semicircular connector of spanning member 2534-1. Joint 2566-3 for third linkage assembly 2522-3 is formed by the semicircular connector of spanning member 2534-3, and a cylindrical axle 2558-3 of hinge core 2516 and semicircular slots 2560-3A and 2560-3B of hinge core 2516 that accommodate the semicircular connector of spanning member 2534-3.

As also shown in FIGS. 29 and 30, joint 2568-1A for first linkage assembly 2522-1 is formed by the semicircular connector of intermediate linkage 2530-1A, and a cylindrical axle 2562-1A of hinge core 2516 and semicircular slots 2564-1A1 and 2564-1A2 of hinge core 2516 that accommodate the semicircular connector of intermediate linkage 2530-1A. Joint 2568-1B for first linkage assembly 2522-1 is formed by the semicircular connector of intermediate linkage 2530-1B, and a cylindrical axle 2562-1B of hinge core 2516 and semicircular slots 2564-1B1 and 2564-1B2 of hinge core 2516 that accommodate the semicircular connector of intermediate linkage 2530-1B.

Joint 2568-3A for third linkage assembly 2522-3 is formed by the semicircular connector of intermediate linkage 2530-3A, and a cylindrical axle 2562-3A of hinge core 2516 and semicircular slots 2564-3A1 and 2564-3A2 of hinge core 2516 that accommodate the semicircular connector of intermediate linkage 2530-3A. Joint 2568-3B for third linkage assembly 2522-3 is formed by the semicircular connector of intermediate linkage 2530-3B, and a cylindrical axle 2562-3B of hinge core 2516 and semicircular slots 2564-3B1 and 2564-3B2 of hinge core 2516 that accommodate the semicircular connector of intermediate linkage 2530-3B.

Joints 2566-1, 2566-3, 2568-1A, 2568-1B, 2568-3A, and 2568-3B each provide respective virtual pivots in this example. As previously described, the virtual pivot of a four-bar linkage or other multi-bar linkage (e.g., a five-bar, six-bar, etc.) can be located at a position that is displaced from hardware components, thereby enabling a greater radius of curvature of the flexible display for a given size (e.g., thickness) of the computing device.

FIG. 30 further shows receptacles 2556-1A and 2556-1B of hinge core 2516 that accommodate clips 2554-1 and 2554-2 of mounting bracket 2552-1, respectively; and receptacles 2556-2A and 2556-2B of hinge core 2516 that accommodate the pair of clips of mounting bracket 2552-2.

Figure 31:
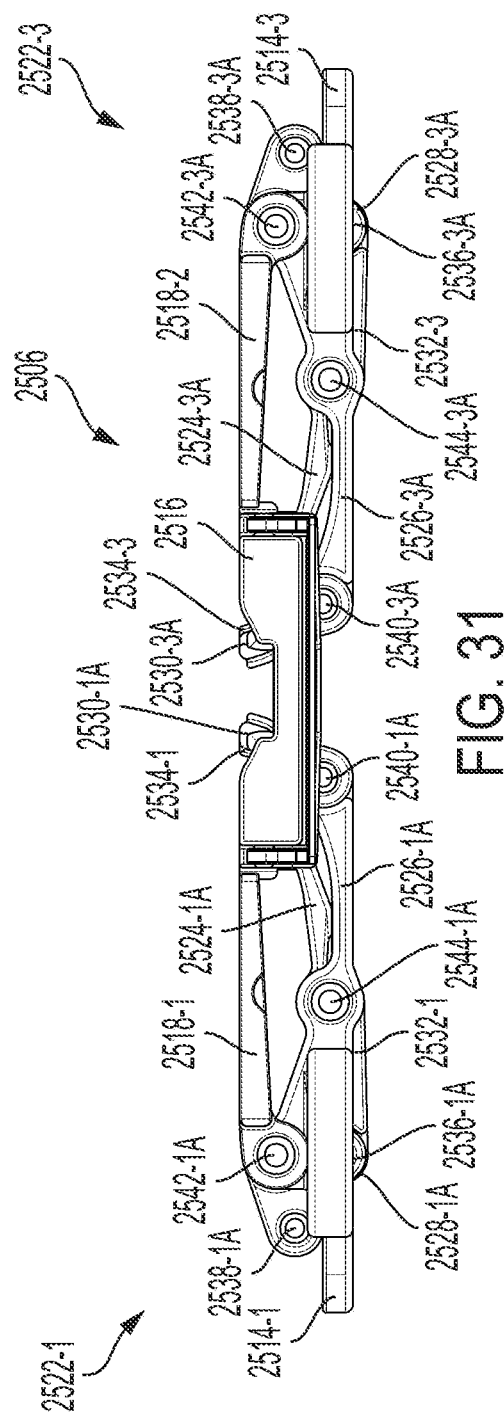
FIG. 31 shows an end view of the hinge assembly of FIG. 25 in the open/unfolded configuration.

FIG. 31 shows an end view of hinge assembly 2506 in the open/unfolded configuration. As shown in FIG. 31, first display backing linkage 2518-1, hinge core 2516, and second display backing linkage 2518-2 provide a planar backing support for the flexible display. Additionally, spanning members 2534-1 and 2534-3 can also provide part of the backing support for the flexible display.

Figure 32:
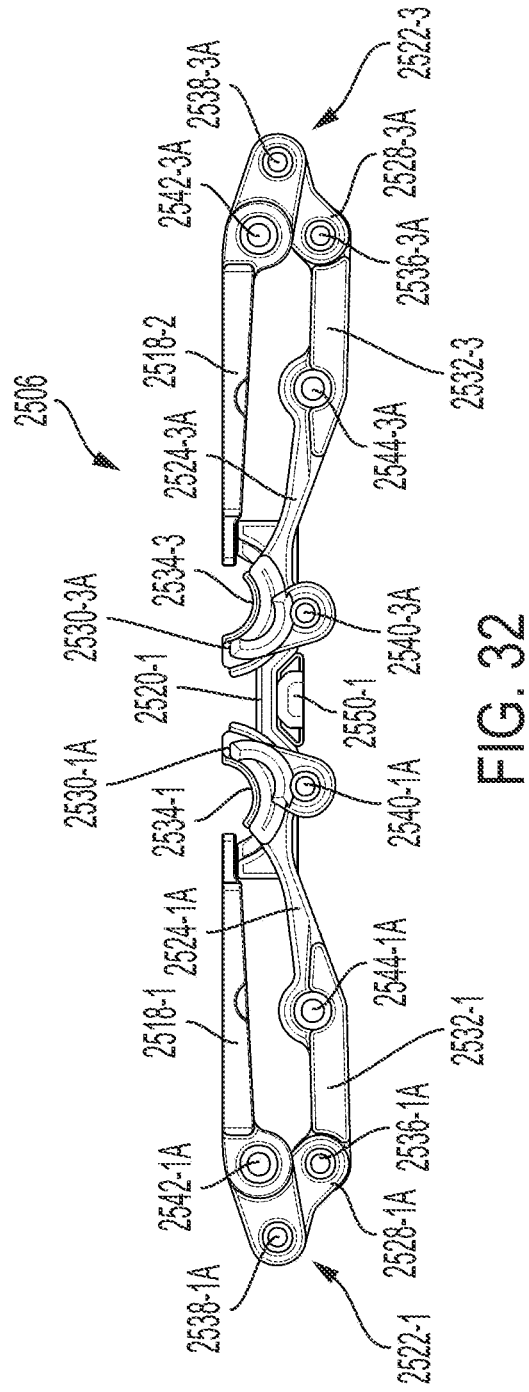
FIG. 32 shows the end view of the hinge assembly of FIG. 31 in the open/unfolded configuration with components removed to reveal additional features of the hinge assembly.

FIG. 32 shows the end view of hinge assembly 2506 of FIG. 31 in the open/unfolded configuration with components removed, including hinge core 2516, first bracket 2514-1 including second rocker linkage 2526-1A, and third bracket 2514-3 including second rocker linkage 2526-3A.

FIG. 33 shows the end view of hinge assembly 2506 of FIG. 31 with flexible display 2508 in the closed/folded configuration. In this example, flexible display 2508 has a curved, "teardrop" shape when hinge assembly 2506 is in the close/folded configuration. For example, linkages 2518-1 and 2518-2, and hinge core 2516 collectively form at least a portion of the backing support for flexible display 2508 that conforms the flexible display to the curved, "teardrop" shape. Additionally, as shown in FIG. 33, second rocker linkage 2526-1A of first bracket 2514-1 and second rocker linkage 2526-3A of third bracket 2514-3 form part of the backing support for the flexible display.

As previously described, this "teardrop" shape of the flexible display may reduce degradation, damage, or wear to the flexible display over folding or unfolding cycles. Additionally, as discussed above, other components of the computing device can be located on a rear side of the flexible display at regions where opposing sides of the flexible display narrow towards each other. For example, as shown in FIG. 33, other components of the computing device can be located on a rear side of flexible display 2508 in regions beyond hinge assembly 2506 from the curved region of the flexible display in the vicinity of hinge core 2516.

According to an example of the present disclosure, a foldable computing device comprises: a first portion; a second portion; a hinge assembly rotatably coupling the first portion to the second portion; and a flexible display extending at least partially across the first portion, at least partially across the second portion, and spanning the hinge assembly between the first portion and the second portion. The hinge assembly includes a hinge core; a helical timing element defining a first set of one or more helical surfaces and a second set of one or more helical surfaces; a first linkage component rotatably coupling the hinge core to the first portion, the first linkage component defining one or more helical surfaces that interface with the first set of helical surfaces of the helical timing element; a first hinge guide rotatably coupling the hinge core to the first portion; a second linkage component rotatably coupling the hinge core to the second portion, the second linkage component defining one or more helical surfaces that interface with the second set of helical surfaces of the helical timing element;

and a second hinge guide rotatably coupling the hinge core to the second portion. In this example or other examples disclosed herein, a first four-bar linkage is formed by the first portion, the hinge core, the first linkage component, and the first hinge guide; and a second four-bar linkage is formed by the second portion, the hinge core, the second linkage component, and the second hinge guide. In this example or other examples disclosed herein, the helical timing element coordinates rotation of the first portion relative to the hinge core via the first linkage component with rotation of the second portion relative to the hinge core via the second linkage component. In this example or other examples disclosed herein, rotation of the first linkage component relative to the second linkage component induces translation of the helical timing element relative to the hinge core in a first dimension along a spine of the foldable computing device and translation of the helical element in a second dimension relative to the flexible display that is orthogonal to the first dimension. In this example or other examples disclosed herein, the helical timing element forms a portion of a backing support for the flexible display. In this example or other examples disclosed herein, the helical timing element defines a planar surface that forms the portion of the backing support for the flexible display. In this example or other examples disclosed herein, the first linkage component forms another portion of a backing support for the flexible display; and the second linkage component forms another portion of the backing support for the flexible display. In this example or other examples disclosed herein, a backing support surface of the first linkage component for the flexible display is angled relative to a backing support surface of the first portion for the flexible display in a folded configuration of the foldable computing device, and is coplanar with the backing support surface of the first portion in an unfolded configuration of the foldable computing device; and a backing support surface of the second linkage component for the flexible display is angled relative to a backing support surface of the second portion for the flexible display in the folded configuration of the foldable computing device, and is coplanar with the backing support surface of the second portion in the unfolded configuration of the foldable computing device. In this example or other examples disclosed herein, at least a portion of the flexible display has a curved, teardrop shape in the folded configuration of the foldable computing device.

According to another example of the present disclosure, a foldable computing device comprises: a first portion; a second portion; a hinge assembly rotatably coupling the first portion to the second portion; and a flexible display extending at least partially across the first portion, at least partially across the second portion, and spanning the hinge assembly between the first portion and the second portion. The hinge assembly includes: a hinge core; a first linkage component rotatably coupling the hinge core to the first portion; a first hinge guide rotatably coupling the hinge core to the first portion, the first hinge guide defining a first helical channel; a second linkage component rotatably coupling the hinge core to the second portion; a second hinge guide rotatably coupling the hinge core to the second portion, the second hinge guide defining a second helical channel; and a timing element defining a first protrusion that interfaces with the first helical channel of the first hinge guide, and a second protrusion that interfaces with the second helical channel of the second hinge guide. In this example or other examples disclosed herein, a first four-bar linkage is formed by the first portion, the hinge core, the first linkage component, and the first hinge guide; and a second four-bar linkage is formed by the second portion, the hinge core, the second linkage component, and the second hinge guide. In this example or other examples disclosed herein, the timing element coordinates rotation of the first portion relative to the hinge core via the first hinge guide with rotation of the second portion relative to the hinge core via the second hinge guide. In this example or other examples disclosed herein, the foldable computing device further comprises a carrier shaft mounted to the hinge core; wherein the carrier shaft passes through an opening formed in the timing element; and wherein rotation of the first hinge guide relative to the second hinge guide induces translation of the helical timing element relative to the carrier shaft and along a spine of the foldable computing device. In this example or other examples disclosed herein, the timing element forms a portion of a backing support for the flexible display. In this example or other examples disclosed herein, the first linkage component forms another portion of a backing support for the flexible display; and the second linkage component forms another portion of the backing support for the flexible display. In this example or other examples disclosed herein, a backing support surface of the first linkage component for the flexible display is angled relative to a backing support surface of the first portion for the flexible display in a folded configuration of the foldable computing device, and is coplanar with the backing support surface of the first portion in an unfolded configuration of the foldable computing device; and a backing support surface of the second linkage component for the flexible display is angled relative to a backing support surface of the second portion for the flexible display in the folded configuration of the foldable computing device, and is coplanar with the backing support surface of the second portion in the unfolded configuration of the foldable computing device. In this example or other examples disclosed herein, at least a portion of the flexible display has a curved, teardrop shape in the folded configuration of the foldable computing device.

According to another example of the present disclosure, a foldable computing device comprises: a first portion; a second portion; a hinge assembly rotatably coupling the first portion to the second portion; and a flexible display extending at least partially across the first portion, at least partially across the second portion, and spanning the hinge assembly between the first portion and the second portion. The hinge assembly includes a hinge core; a first rocker linkage rotatably coupling the hinge core to the first portion, the first rocker linkage defining a set of one or more helical threads; a second rocker linkage rotatably coupling the hinge core to the first portion; a third rocker linkage rotatably coupling the hinge core to the second portion, the third rocker linkage defining a set of one or more helical threads; a fourth rocker linkage rotatably coupling the hinge core to the second portion; and a timing element defining a first set of one or more helical threads that interface with the set of one or more helical threads of the first rocker linkage, and a second set of one or more helical threads that interface with the set of one or more helical threads of the fourth rocker linkage; wherein the timing element coordinates rotation of the first portion relative to the hinge core via the first rocker linkage with rotation of the second portion relative to the hinge core via the second rocker linkage. In this example or other examples disclosed herein, the first rocker linkage rotatably couples the first portion to the hinge core via a joint that rotatably couples the first rocker linkage and the second rocker linkage; and the third rocker linkage rotatably couples the second portion to the hinge core via a joint that rotatably couples the third rocker linkage and the fourth rocker linkage. In this example or other examples disclosed herein, the foldable computing device further comprises: a first display backing linkage that forms a portion of a backing support for the flexible display; a first coupler linkage rotatably coupling the first display backing linkage to the first rocker linkage; a second display backing linkage that forms another portion of the backing support for the flexible display; and a second coupler linkage rotatably coupling the second display backing linkage to the third rocker linkage.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A foldable computing device, comprising:
   a first portion;
   a second portion;
   a hinge assembly rotatably coupling the first portion to the second portion; and
   a flexible display extending at least partially across the first portion, at least partially across the second portion, and spanning the hinge assembly between the first portion and the second portion;
   the hinge assembly including:
      a hinge core;
      a helical timing element defining a first set of one or more helical surfaces and a second set of one or more helical surfaces, wherein the helical timing element forms a portion of a backing support for the flexible display;
      a first linkage component rotatably coupling the hinge core to the first portion, the first linkage component defining one or more helical surfaces that interface with the first set of helical surfaces of the helical timing element, wherein the first linkage component forms another portion of the backing support for the flexible display;
      a first hinge guide rotatably coupling the hinge core to the first portion;
      a second linkage component rotatably coupling the hinge core to the second portion, the second linkage component defining one or more helical surfaces that interface with the second set of helical surfaces of the helical timing element, wherein the second linkage component forms another portion of the backing support for the flexible display; and
      a second hinge guide rotatably coupling the hinge core to the second portion, wherein
      a backing support surface of the first linkage component for the flexible display is angled relative to a backing support surface of the first portion for the flexible display in a folded configuration of the foldable computing device, and is coplanar with the backing support surface of the first portion in an unfolded configuration of the foldable computing device; and wherein
      a backing support surface of the second linkage component for the flexible display is angled relative to a backing support surface of the second portion for the flexible display in the folded configuration of the foldable computing device, and is coplanar with the backing support surface of the second portion in the unfolded configuration of the foldable computing device.

2. The foldable computing device of claim 1, wherein a first four-bar linkage is formed by the first portion, the hinge core, the first linkage component, and the first hinge guide; and
   wherein a second four-bar linkage is formed by the second portion, the hinge core, the second linkage component, and the second hinge guide.

3. The foldable computing device of claim 1, wherein the helical timing element coordinates rotation of the first portion relative to the hinge core via the first linkage component with rotation of the second portion relative to the hinge core via the second linkage component.

4. The foldable computing device of claim 1, wherein rotation of the first linkage component relative to the second linkage component induces translation of the helical timing element relative to the hinge core in a first dimension along a spine of the foldable computing device and translation of the helical element in a second dimension relative to the flexible display that is orthogonal to the first dimension.

5. The foldable computing device of claim 1, wherein the helical timing element defines a planar surface that forms the portion of the backing support for the flexible display.

6. The foldable computing device of claim 1, wherein at least a portion of the flexible display has a curved, teardrop shape in the folded configuration of the foldable computing device.

7. A foldable computing device, comprising:
   a first portion;
   a second portion;
   a hinge assembly rotatably coupling the first portion to the second portion; and
   a flexible display extending at least partially across the first portion, at least partially across the second portion, and spanning the hinge assembly between the first portion and the second portion;
   the hinge assembly including:
      a hinge core;
      a first linkage component rotatably coupling the hinge core to the first portion, wherein the first linkage component forms a portion of a backing support for the flexible display;
      a first hinge guide rotatably coupling the hinge core to the first portion, the first hinge guide defining a first helical channel;
      a second linkage component rotatably coupling the hinge core to the second portion, wherein the second linkage component forms another portion of the backing support for the flexible display;
      a second hinge guide rotatably coupling the hinge core to the second portion, the second hinge guide defining a second helical channel; and
      a timing element defining a first protrusion that interfaces with the first helical channel of the first hinge guide, and a second protrusion that interfaces with the second helical channel of the second hinge guide, wherein the timing element forms another portion of the backing support for the flexible display,
      wherein a backing support surface of the first linkage component for the flexible display is angled relative to a backing support surface of the first portion for the flexible display in a folded configuration of the foldable computing device, and is coplanar with the backing support surface of the first portion in an unfolded configuration of the foldable computing device; and wherein a backing support surface of the second linkage component for the flexible display is angled relative to a backing support surface of the second portion for the flexible display in the folded configuration of the foldable computing device, and is coplanar with the backing support surface of the second portion in the unfolded configuration of the foldable computing device.

8. The foldable computing device of claim 7, wherein a first four-bar linkage is formed by the first portion, the hinge core, the first linkage component, and the first hinge guide; and wherein a second four-bar linkage is formed by the second portion, the hinge core, the second linkage component, and the second hinge guide.

9. The foldable computing device of claim 7, wherein the timing element coordinates rotation of the first portion relative to the hinge core via the first hinge guide with rotation of the second portion relative to the hinge core via the second hinge guide.

10. The foldable computing device of claim 7, further comprising:

a carrier shaft mounted to the hinge core;

wherein the carrier shaft passes through an opening formed in the timing element; and wherein rotation of the first hinge guide relative to the second hinge guide induces translation of the helical timing element relative to the carrier shaft and along a spine of the foldable computing device.

11. The foldable computing device of claim 7, wherein at least a portion of the flexible display has a curved, teardrop shape in the folded configuration of the foldable computing device.

12. A foldable computing device, comprising:

a first portion;

a second portion;

a hinge assembly rotatably coupling the first portion to the second portion; and a flexible display extending at least partially across the first portion, at least partially across the second portion, and spanning the hinge assembly between the first portion and the second portion;

the hinge assembly including:

a hinge core;

a first rocker linkage rotatably coupling the hinge core to the first portion, the first rocker linkage defining a set of one or more helical threads;

a second rocker linkage rotatably coupling the hinge core to the first portion;

a third rocker linkage rotatably coupling the hinge core to the second portion, the third rocker linkage defining a set of one or more helical threads;

a fourth rocker linkage rotatably coupling the hinge core to the second portion; and a timing element defining a first set of one or more helical threads that interface with the set of one or more helical threads of the first rocker linkage, and a second set of one or more helical threads that interface with the set of one or more helical threads of the fourth rocker linkage;

wherein the timing element coordinates rotation of the first portion relative to the hinge core via the first rocker linkage with rotation of the second portion relative to the hinge core via the second rocker linkage.

13. The foldable computing device of claim 12, wherein the first rocker linkage rotatably couples the first portion to the hinge core via a joint that rotatably couples the first rocker linkage and the second rocker linkage; and wherein the third rocker linkage rotatably couples the second portion to the hinge core via a joint that rotatably couples the third rocker linkage and the fourth rocker linkage.

14. The foldable computing device of claim 12, further comprising:

a first display backing linkage that forms a portion of a backing support for the flexible display;

a first coupler linkage rotatably coupling the first display backing linkage to the first rocker linkage;

a second display backing linkage that forms another portion of the backing support for the flexible display; and a second coupler linkage rotatably coupling the second display backing linkage to the third rocker linkage.

* * * * *